United States Patent [19]

Retti

[11] Patent Number: 5,605,251
[45] Date of Patent: Feb. 25, 1997

[54] PULSELESS PUMP APPARATUS

[75] Inventor: Kahrl L. Retti, Timonium, Md.

[73] Assignee: Quick Tools, LLC, Baltimore, Md.

[21] Appl. No.: 351,580

[22] Filed: Dec. 7, 1994

[51] Int. Cl.$^6$ ................................................ G01F 11/00
[52] U.S. Cl. ........................ 222/1; 222/52; 222/55; 222/63; 222/325
[58] Field of Search .................................... 222/1, 23, 52, 222/55, 61, 63, 183, 175, 325, 333, 282, 290, 478, 410; 417/212, 900; 60/431; 141/DIG. 1, 94, 312, 332

[56] References Cited

U.S. PATENT DOCUMENTS

| | | | |
|---|---|---|---|
| 1,385,412 | 7/1921 | Williams et al. | 222/325 |
| 2,666,323 | 1/1954 | Ames | 72/130 |
| 3,007,837 | 11/1961 | Goode, Jr. | 156/461 |
| 3,297,601 | 1/1967 | Maynard | 260/17.4 |
| 4,211,685 | 7/1980 | Konovenko et al. | 260/30.4 EP |
| 4,477,304 | 10/1984 | Westermann | 156/250 |
| 4,779,762 | 10/1988 | Klein et al. | 222/52 |
| 4,850,513 | 7/1989 | Porter | 222/63 |
| 4,851,044 | 7/1989 | Stawinski | 106/18.12 |
| 5,013,389 | 5/1991 | Retti | 156/526 |
| 5,115,035 | 5/1992 | Shiraki et al. | 525/314 |
| 5,238,147 | 8/1993 | Yasui et al. | 222/63 |
| 5,240,500 | 8/1993 | Retti | 106/778 |
| 5,271,521 | 12/1993 | Noss et al. | 222/55 |
| 5,279,684 | 1/1994 | Retti | 156/71 |
| 5,279,700 | 1/1994 | Retti | 156/578 |
| 5,336,318 | 9/1994 | Attard et al. | 106/780 |
| 5,359,014 | 10/1994 | Forgione et al. | 525/455 |

*Primary Examiner*—Andres Kashnikow
*Assistant Examiner*—Philippe Derakshani
*Attorney, Agent, or Firm*—Roylance, Abrams, Berdo & Goodman, L.L.P.

[57] ABSTRACT

A pumping apparatus is provided for dispensing fluid material which comprises a fluid material supply container and a pump for conducting the fluid material from the container to a dispensing head. A controller receives data from a sensor in the container which identifies fluid material type. A pressure sensor in the dispensing head is used by the controller to continuously monitor fluid pressure and to control the flow rate by adjusting the application of current to electromagnetic coils which rotate an impeller in the pump. A timing device is used by the controller to measure the fluid flow rate. The controller adjusts the flow rate to a preprogrammed rate corresponding to the fluid material type by changing the position of pressure plates with respect to the impeller. A dispensing head is provided for applying joint compound to a wallboard joint. A water based composition for a joint compound is provided which comprises a pure gypsum plaster, an aliphatic resin glue and water, but no added alcohol or abrasive fillers.

36 Claims, 17 Drawing Sheets

5,605,251

PULSELESS PUMP APPARATUS

FIELD OF THE INVENTION

The present invention is directed to a pulseless pump apparatus for high viscosity fluids. More particularly, the invention is directed to a pump apparatus having an automated control system to control the output flow from the pump to a dispensing head.

BACKGROUND OF THE INVENTION

Many different kinds of viscous materials are used in the construction industry, including, for example, adhesives and wallboard mud or joint compound. These materials are usually premixed and applied to the work surface using hand tools. The proper application of the materials require a certain degree of skill and technique to consistently obtain high quality finishing results. Variations in composition, texture and viscosity of the materials often lead to inconsistent results even when applied by an experienced worker.

Numerous tools have been developed over the years to increase the speed and ease of applying the viscous materials to the work surface. One form of tool includes a pumping apparatus to deliver the material from a supply container to a dispensing head. These previous pump devices often have difficulty pumping high viscosity materials. A problem commonly encountered with the pumping of high viscosity materials is the surging of the material through the discharge outlet. Surging is particularly great when a change in the output flow rate is needed and the pump attempts to provide an immediate response to the pressure change. Thus, the previous pump operated devices for dispensing and applying viscous construction materials are difficult to use to obtain consistent results.

A major deficiency in the previous pump operated devices is the short operating life of the pump when applying viscous materials containing abrasive fillers or other solids. For example, wallboard joint compound contains large amounts of calcium sulfate dihydrate and silica fillers. These fillers are highly abrasive which quickly erode any wear surfaces in the pump and in particular bearing surfaces and impeller surfaces. The high rate of wear on the impeller surfaces quickly result in a loss of pump pressure thereby rendering the pump unserviceable.

Many adhesive and mastic materials contain volatile or toxic solvents. It is generally desirable to contain the vapors during application of the materials. The prior applicators do not adequately collect volatile and toxic solvents in a suitable containment unit for proper disposal.

Examples of prior devices for applying adhesives, wallboard mud or joint compound and other materials are generally disclosed in U.S. Pat. Nos. 5,013,389 to Retti; 5,240,500 to Retti; 5,279,684 to Retti; 4,477,304 to Westermann; 2,666,323 to Ames; and 3,007,837 to Goode, Jr. These patents have attained only limited success due in part to the inability of the devices to withstand the abrasive nature of many of the compounds being applied. Some of these devices include complex electronic controls to deliver the material at predetermined rates. These electronic controls add considerably to the manufacturing costs and maintenance of the tools, while not solving the problem of lack of uniformly controlled flow of mastic. Thus, there is a continuing need in the industry for a suitable tool for applying viscous materials to a work surface.

SUMMARY OF THE INVENTION

The present invention is directed to an automated pump apparatus capable of pumping high viscosity fluids. Accordingly, it is a primary object of the invention to provide an automated pump apparatus for pumping high viscosity fluid materials from a storage container to a dispensing nozzle while maintaining a controlled flow of the fluid material.

A further object of the invention is to provide pump apparatus for highly abrasive fluid materials while reducing wear of the pump components to extend the useful life of the pump.

Another object of the invention is to provide a pump apparatus for dispensing fluid materials containing volatile components and recovering at least a portion of the vapors.

Still another object of the invention is to provide a pump apparatus for pumping flammable materials in a safe and efficient fashion.

Another object of the invention is to provide a pump apparatus having a microprocessor or other control device to pump a material at a controlled rate.

A further object of the invention is to provide a pump apparatus having an indicator for determining the type of fluid material being pumped and a microprocessor for controlling pump operation in an appropriate manner for the fluid material.

Another object of the invention is to provide a pump apparatus having a sensor for sensing volatile components in a fluid material being pumped and a device for recovering the volatile material.

A further object of the invention is to provide microprocessor-controlled pump apparatus for receiving viscous materials from a reservoir and pumping the viscous material to a tool or dispensing head for applying a controlled and constant amount of the material to a work surface.

Still another object of the invention is to provide a variable output pump driven at a substantially constant speed where the output is controlled by varying the internal volume of the pump housing.

A further aspect of the invention is to provide a pump apparatus having a microprocessor to automatically control the internal pump pressure and output flow in response to flow conditions measured at a dispensing outlet.

These and other aspects of the invention are basically attained by a dispensing apparatus for providing a substantially continuous and controlled supply of fluid material, said apparatus comprising: a supply container, for containing a fluid material; a pump having a drive motor coupled to said pump, for driving said pump; a fluid material inlet and outlet, said inlet being connected to said supply container for receiving the fluid material; a dispensing device connected to said pump outlet, said device having an outlet for dispensing said fluid material; a pressure sensor disposed in said dispensing device, for continuously sensing fluid material pressure at said dispensing outlet of said dispensing device; and a processing device connected to said pressure sensor and to said pump, for continuously monitoring fluid pressure at said dispensing device and adjusting the fluid output of said pump in relation to said fluid pressure at said dispensing device.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring to the drawings which form a part of this original disclosure, in which.

DETAILED DESCRIPTION OF THE INVENTION

Figure 1:
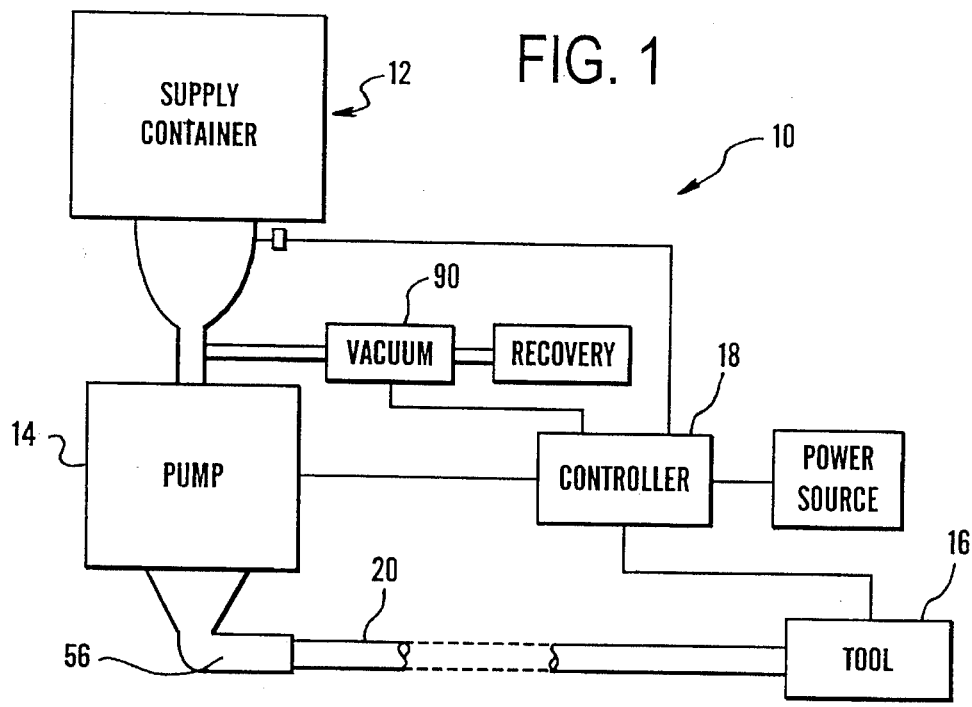
FIG. 1 is a schematic view of the pump apparatus in a preferred embodiment of the invention showing a supply container, a pump assembly, a controller for controlling the pump assembly, and a dispensing head.

Referring to FIG. 1, the present invention is directed to a pulseless pumping apparatus 10 for dispensing a fluid material including a supply container 12, pump assembly 14, dispensing head 16 and controller 18 for controlling the output of the pumping assembly. The pumping apparatus 10 of the invention is particularly well suited for pumping viscous materials to a dispensing head 16 for applying the material to a work surface. Controller 18 is connected to dispensing head 16 to sense the flow conditions and pump requirements for the particular dispensing task and control the output flow from the pump assembly 14. A supply tube 20 connects pump assembly 14 to dispensing head 16.

Pumping apparatus 10 in preferred embodiments is mounted on a suitable carriage or provided with shoulder straps and harness (not shown) for carrying on the operator's back. The apparatus can be connected to power outlet or be provided with a self-contained internal power source, such as a battery pack, as discussed hereinafter in greater detail.

Pumping apparatus 10 is able to pump a variety of different viscous materials efficiently and easily. Controller 18 is designed to determine the type of material being pumped and control the operation of pumping assembly 14 according to the type of material by continuously monitoring internal pump pressure and output pressure at dispensing head 16 and adjusting the output flow to meet the requirements of dispensing head 16.

Examples of suitable viscous materials include wallboard joint compound, floor mastics, ceramic tile mastics, wallpaper adhesives and ceiling tile adhesives. Dispensing head 16 is in a form to accommodate the particular material being pumped and includes appropriate tooling to effectively apply the material. For example, a wallboard joint compound uses a tool having a smoothing blade and joint tape dispenser as discussed hereinafter in greater detail. The compositions pumped by pumping apparatus 10 can be standard commercially available materials or can be specially formulated for the particular end use.

Figure 2:
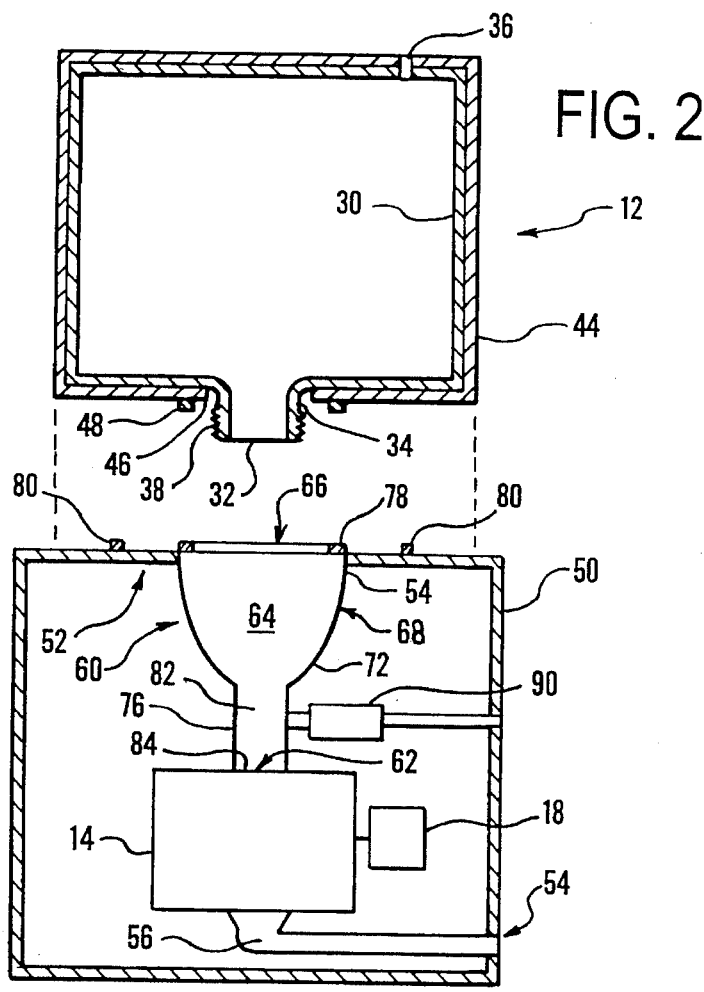
FIG. 2 is a partial cross-sectional side view of the pump assembly and supply container.
Figure 3:
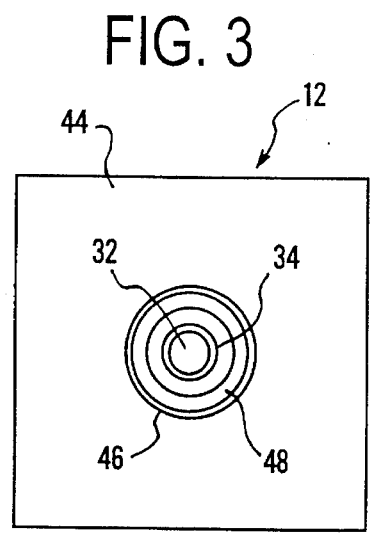
FIG. 3 is a top view of the supply container.

FIG. 2 shows a partial cross-sectional view of pump apparatus 10 and supply container 12. Supply container 12 can be a variety of shapes and sizes depending on the material being dispensed and the volume needed. In one preferred embodiment illustrated in FIGS. 2 and 3, supply container 12 includes a hollow plastic jug-like container 30 having an outlet 32 defined by a neck 34. Container 30 preferably has thin flexible walls so that container 30 can collapse as material is withdrawn from within. In this manner, it is not always necessary to vent container 30, although an optional one-way venting valve 36 can be included to allow air to enter container 30.

Neck 34 of container 30 is dimensioned to provide a sufficiently large opening to allow the material to flow easily to pump assembly 14. The outer surface of neck 34 preferably includes external threads 38 for mating with internal threads of a closure cap (not shown). Alternatively, neck 34 can include a lip (not shown) for receiving a suitable closure by an interference fit. Container 30 is preferably housed within a protective housing 44 to prevent crushing or puncturing of container 30. Typically, housing 44 is a crush-resistant cardboard carton enclosing the sides and ends of container 30 and including an opening 46 for neck 34 of container 30.

Supply container 12 in embodiments of the invention includes an identification device for identifying the material in container 30. In the embodiment of FIG. 2, an annular magnet 48 is fixed to container 30 around neck 34. Magnet 48 is characterized by a predetermined gauss assigned to a particular material as a means to identify the material in container 30. Magnet 48 is positioned so that, when supply container 30 is coupled with pump assembly 14, a magnetic reed switch 78 contacts magnet 48 and, after being converted to a digital signal, sends an identifying signal to controller 18 identifying the contents. Controller 18 operates pump assembly 14 according to the identifying signal as discussed hereinafter. In further embodiments, magnets can be attached to housing 44 and mounted in any convenient location which can mate with a sensor or reed switch on pump assembly 14. Although an annular ring-shaped magnet 48 is preferred, the magnet can be any suitable shape and size. Preferably magnet 48 is a rubberized magnet material as known in the art.

Pumping apparatus 10 further includes a housing 50 enclosing pump assembly 14 and controller 18 as shown in FIG. 2. The upper end 52 of housing 50 includes an opening 54 for coupling with supply container 12 and delivering the material to pump assembly 14. A lower end also includes an opening 54 receiving a discharge conduit 56 for carrying the material from pump assembly 14 to dispensing head 16.

Figure 4:
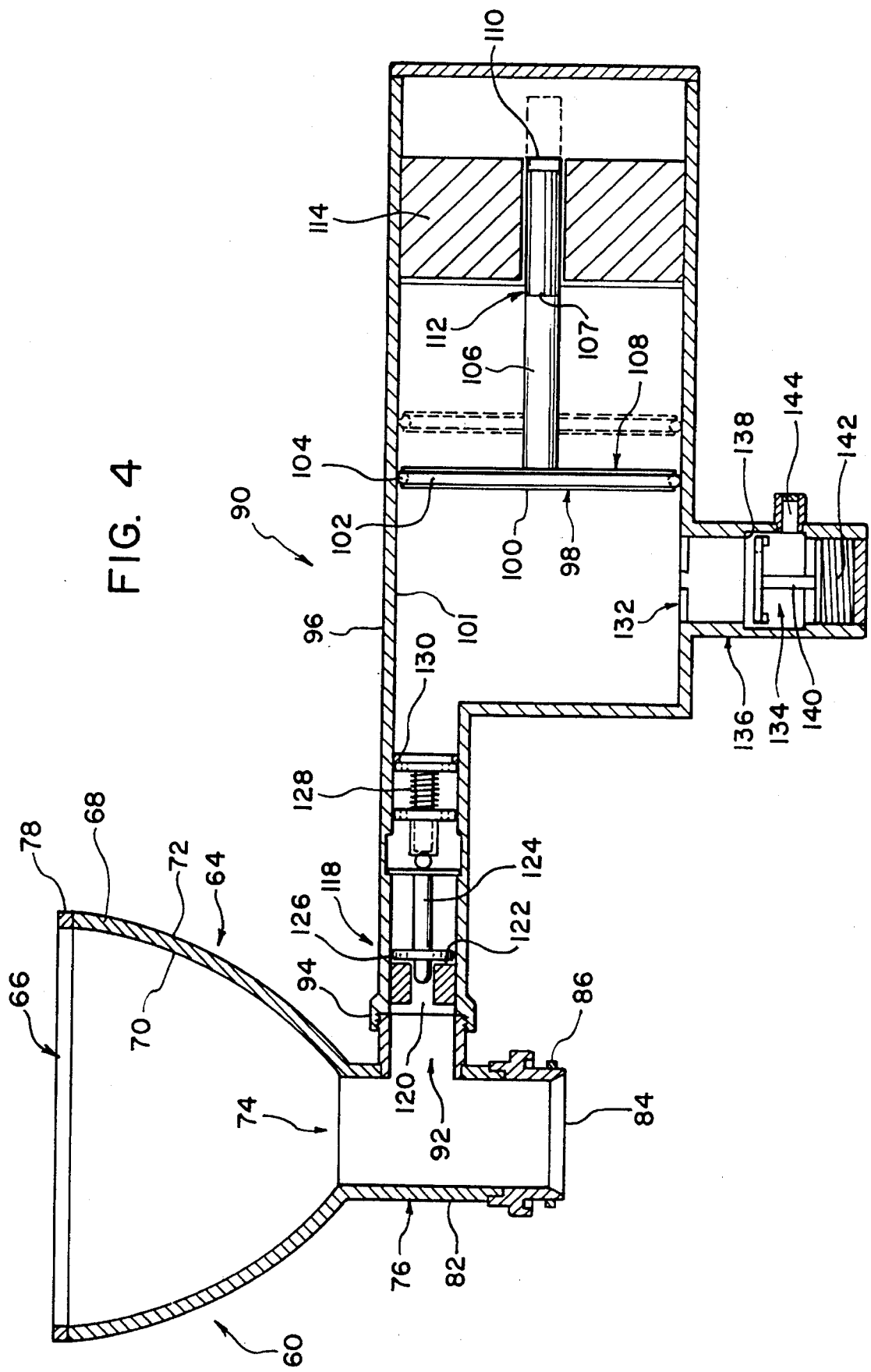
FIG. 4 is a cross-sectional view of a vacuum generation device.

As shown in FIG. 2, pumping apparatus 10 contains an inlet conduit 60 extending through opening 54 of housing 50 to an inlet 62 of pump assembly 14. As shown in FIG. 4 inlet conduit 60 includes a material inlet cone 64 having an open upper end 66 positioned at the upper face of housing 50 within opening 54. Inlet cone 64 further includes a curvilinear side wall 68 defining a concave inner surface 70 and a convex outer surface 72. Side wall 68 converges to an outlet 74 and is coupled to a cylindrical throat tube 76. The conical shape of inlet cone 64 serves to receive the material from container 12 and feed the material to pump assembly 14 in a substantially linear flow without inducing turbulence to the material.

Upper end 66 of inlet cone is preferably attached to the upper surface of housing 50 adjacent opening 54. Alternatively, upper end 66 of inlet cone 64 extends above the upper surface 52 of housing 50. In preferred embodiments, upper end 66 of inlet cone 64 is equipped with an annular reed switch 78 for sensing magnet 48 of supply container 12. Reed switch 78 and upper end 66 of inlet cone 64 are dimensioned to mate with annular magnet 48. An optional seal 80 is provided on housing 50 surrounding inlet opening 52 and inlet cone 64 to form a fluid tight seal between housing 50 and inlet cone 64 and the opposing face of supply container 12. Reed switch 78 as shown in FIG. 4 which is activated when magnet 48 makes contact and sends a signal to controller 18 indicating the type of material in container 12.

In preferred embodiments, inlet cone 64 and throat tube 76 are positioned vertically to define a gravity feed from supply container 12 to pump assembly 14. Throat tube 76 includes a cylindrical body portion 82 terminating at a lower end 84. As shown in FIG. 4, lower end 84 includes a seal 86 to form a fluid tight connection with pump assembly 14.

A vacuum generation assembly 90 is coupled to throat tube 76 to communicate to the interior thereof through and opening 92 in tube 76. During initial start up of pumping apparatus 10, as discussed hereinafter, vacuum generation assembly 90 draws air and vapors within throat tube 76 and inlet cone 64 by creating a negative pressure therein. The negative pressure draws the material from supply container 12 into inlet cone 64 and throat tube 76 and removes any air pockets from the apparatus to reduce the incidence of surging or sputtering in pump assembly 14 during startup. As discussed hereinafter in greater detail, vacuum generation assembly 90 is connected to and operated by controller 18 during initial start up of the apparatus.

Referring to FIG. 4, vacuum generation assembly 90 includes a conduit 94 connected to opening 92 of throat tube 76 and connected to a cylinder 96. A piston 98 is mounted within cylinder 96 for reciprocating movement. Piston 98 has a circular disk-like shape having an outer edge 100 with an outwardly facing annular recess 102. A piston ring or packing seal 104 is provided in annular recess 102 to engage the inner wall 101 of cylinder 96 in fluid-tight engagement. Piston ring 104 can be made of metal, graphite composite or plastic material as known in the art.

A piston connecting rod 106 extends from a rear face 108 of piston 98 and terminates at a distal end 110. Distal end 110 of piston rod 106 extends axially through a central opening 112 in an electromagnetic coil 114. Piston rod 106 can be magnetized or contain a magnetized portion 107. Electromagnetic coil 114 is energized by a power source 400 which is connected to and actuated by controller 18 and described in more detail below. Power source 400 is able to supply current selectively in opposite directions through electromagnetic coil 114. Current supplied to electromagnetic coil 114 in one direction energizes coil 114 to draw piston rod 106 and piston 98 toward coil 114 as shown in phantom lines in FIG. 4 thereby drawing a vacuum in cylinder 96, conduit 94 and throat tube 76. The vacuum draws the air and vapors present in throat tube 76 and assists in drawing the material from supply container 12 into inlet cone 64.

A check valve 118 is positioned in conduit 94 to permit air and vapors to be drawn from inlet conduit 60 into cylinder 96 by reciprocating movement of piston 98. Check valve 118 includes an axial passage 120 having a valve seat 122 on the high pressure side of check valve 118. A spring biased needle valve 124 has a valve face 126 engaging valve seat 122. A coil spring 128 has one end engaging a stop member 130 and the opposite end engaging and biasing needle valve 124 in the closed position. Other check valve assemblies as known in the art can be used in alternative embodiments.

Cylinder 96 of vacuum apparatus 90 also includes an outlet 132 having a check valve 134. Check valve 134 includes a cylindrical body 136 having a valve seat 138 and a valve 140 biased toward valve seat 138 by a coil spring 142. As shown in FIG. 4, check valve 134 is normally biased in the closed position and is opened by high pressure in cylinder 96. Valve body 136 includes an outlet 144 on the low pressure side of valve 134. Outlet 144 can be coupled by a quick release coupling (not shown) to a vapor recovery unit containing a suitable adsorbent or other reclamation material. Alternatively, outlet 144 can be used to vent the air and vapors to the atmosphere. Vacuum apparatus 90 is particularly suitable when the material being pumped contains toxic or flammable vapors. These toxic and flammable vapors can be recovered for safe disposal.

In use, controller 18 sends a signal to a relay connected to power source 400 to energize electromagnetic coil 114 to draw piston rod 106 and piston 98 toward the coil 114 thereby creating a negative pressure within cylinder 96. This negative pressure closes check valve 134 and opens check valve 118 to draw air and vapors from inlet conduit 60 and draw material from supply container 12 into cone 60. At the end of a cycle, controller 18 sends a second signal to reverse the flow of current to electromagnetic coil 114 thereby causing piston 98 to move away from the coil 114. As piston 98 moves away from coil 114, valve 118 closes and piston 98 begins to compress the air and vapors within cylinder 96. When the pressure in cylinder 96 exceeds the tension of spring 142, valve 134 opens to allow the air and vapors to vent through outlet 144.

Figure 5:
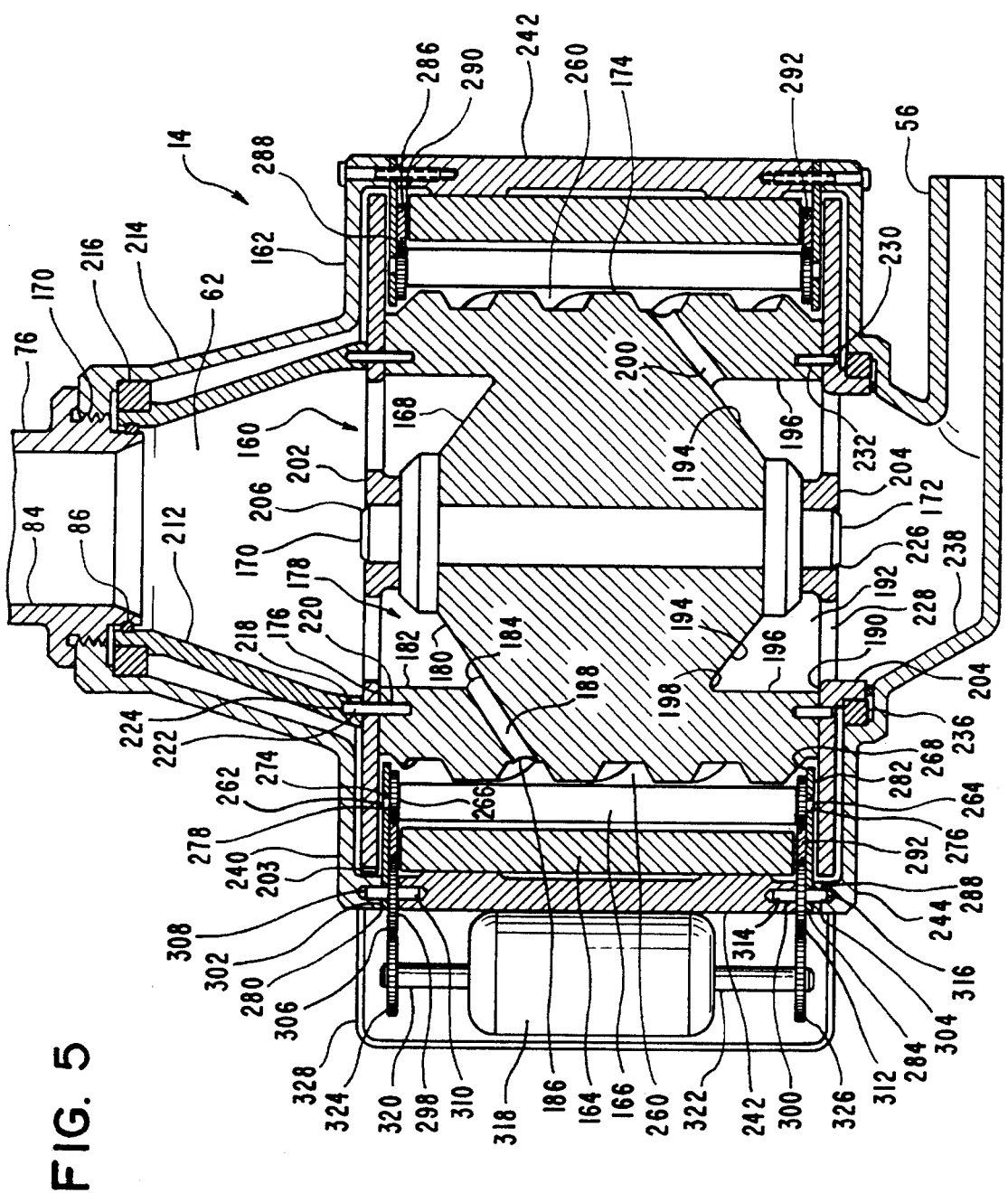
FIG. 5 is a cross-sectional view of the pump assembly showing an impeller, pressure plates with their corresponding gear, and ring gear.

Referring to FIGS. 4 and 5, the fluid material flows downwardly through body 76 toward the inlet end 160 of pump assembly 14. Pump assembly 14 includes an outer casing 162, a rotating impeller 168, a plurality of pressure plates 166 surrounding impeller 168, and a plurality of electromagnetic windings 164. Casing 162 includes an inlet opening 62 at an upper end and a discharge outlet 174 on a bottom end.

Figure 6:
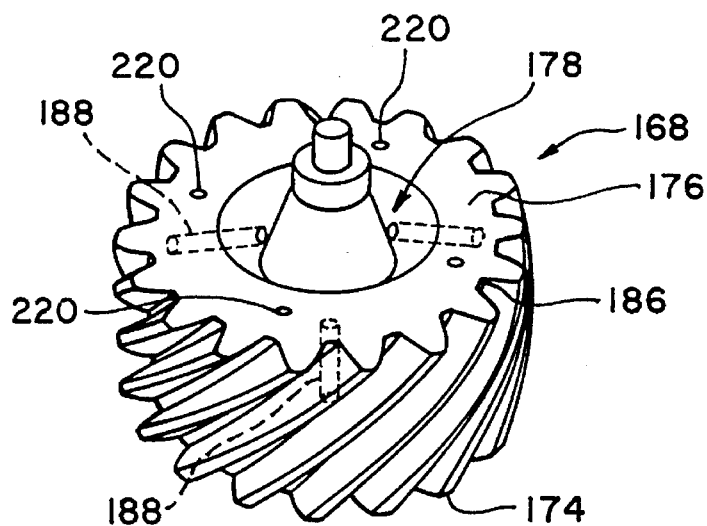
FIG. 6 is a perspective view of the impeller.

Referring to FIGS. 5 and 6, impeller 168 is a helical gear type impeller having an upper axial shaft 170 a lower axial shaft 172 and a plurality of helical gear teeth 174 extending around the circumference of impeller 168. Impeller 168 has an essentially cylindrical overall shape as shown in FIG. 6. In preferred embodiments, helical teeth 174 form a 90° helical gear. An upper surface 176 of impeller 168 includes a recess 178 such that upper axial shaft 170 has a substantially frustoconical shape forming the bottom wall 180 of recess 178. Recess 178 also has a substantially cylindrical side wall 182 converging with bottom wall 180 at an apex 184 defining a lowermost portion of recess 178. A plurality of passageways 188 extend through side wall 182 radially outward and downward to a trough 186 between a pair of adjacent helical teeth 174 as shown in FIG. 5. In preferred embodiments, impeller 168 includes three uniformly spaced, radial upper passageways 188 spaced apart about 120° dimensioned to allow the free flow of the material being pumped. In alternative embodiments, more than three passageways can be provided.

Impeller 168 is symmetrical so that the lower half is substantially identical to the upper half as shown in FIG. 5. A bottom face 190 of impeller 168 includes a recess 192 having conical bottom wall 194 and a cylindrical side wall 196 converging at an apex 198. A plurality of radially extending passageways 200 extend from apex 198 to a trough 186 between a pair of adjacent helical teeth 174. As shown in FIG. 5, passageways 188 extend from recess 178 in a generally downward and outward direction toward gear teeth 174 while passageways 200 extend from trough 186 in a generally downward and inward direction to recess 192. In preferred embodiments, three lower passageways are provided and are staggered about 60° from upper passageways 188. As with upper passageways 188, lower passageways 200 are spaced about 120° from each other.

Figure 9:
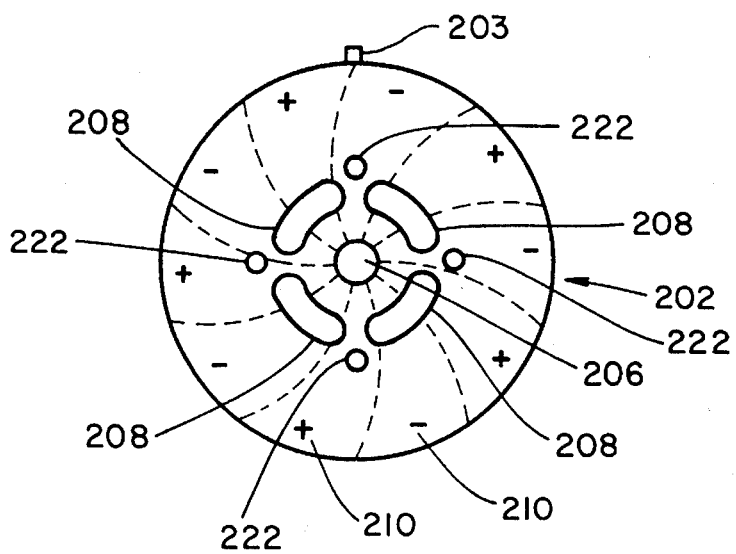
FIG. 9 is a top view of a magnetic plate attached to the impeller in a first embodiment.

Impeller 168 is coupled to upper magnetic plate 202 and lower magnetic plate 204 on the upper axial face 176 and lower axial face 190, respectively. In a preferred embodiment shown in FIG. 9, upper magnetic plate 202 has a circular shape with a central aperture 206 to receive upper axial shaft 170 in a friction gripping manner. Spaced outwardly from central aperture 206 are four arcuate shaped openings 208 defining material passages from inlet 62. As shown in FIG. 9, openings 208 are uniformly spaced apart.

Magnetic plate 202 is made from a magnetic alloy material, such as, for example, an AlNiCo alloy as known in the art. One such material is AlNiCo$_5$. Magnetic plate 202 is magnetized in ten radial areas 210 in alternating polarities for interacting with electromagnetic windings 164 as discussed hereinafter in greater detail. In further embodiments, plate 202 can be a non-magnetic material which has a plurality of magnets attached thereto.

Referring again to FIG. 5, an upper inlet cone 212 is coupled to magnetic plate 202. Upper cone 212 has a substantially frustoconical shape having a side wall parallel to a conical wall 214 of casing 162. The upper end of cone 212 is connected to lower end 84 of tube 76 in a fluid tight manner by seal 86. Cone 212 engages conical wall 214 by a bearing 216 to permit cone 212 to rotate within conical wall 214. In preferred embodiments, retaining pins 218 engage a complementing recess 220 in upper face 176 of impeller 168 and extends through an aperture 222 in upper magnetic plate 202 into a recess 224 in cone 212 to couple cone 212, upper magnetic plate 202 and impeller 176 together.

Lower magnetic plate 204 is substantially the same as upper magnetic plate 202 and includes a central aperture 226 for receiving lower axial shaft 172, material openings 228 communicating with lower recess 192, and apertures 230 receiving pins 232 for coupling lower magnetic plate 204 to lower face 190 of impeller 168 as shown in FIG. 5. Lower magnetic plate 204 engages a bottom wall 234 of casing 162 through a bearing 236. Bottom wall 234 includes a conical outlet 238 connected to pump outlet 174. Lower magnetic plate 204 also comprises a plurality of radial magnetic areas having alternating polarities corresponding to magnetic areas 210 of upper magnetic plate 202. These magnetic areas 210 on the lower and upper magnetic plates are preferably skewed, that is, characterized by curved radii. Upper cone 212, upper magnetic plate 202, impeller 168, and lower magnetic plate 204 are coupled together as an assembly which rotates on bearings 216 and 236 within pump casing 162. Casing 162 as shown in FIG. 5 includes a top member 240, and cylindrical body portion 242 and bottom member 244 coupled together by screws or other fastening means.

Electromagnetic windings 164 are fixed to the inner wall of cylindrical body 242 to essentially form a continuous magnetic wall. The electromagnetic windings are preferably tape wound toroidal cores such as 4–79 MOPERMALLOY electromagnets manufactured by Arnold Manufacturing Company of Edison, N.J.; although other cores suitable for use with high frequency components can be used. Each of electromagnets 164 are connected to controller 18 which controls via relays the supply of electrical current to the electromagnetic winding and thereby energizes it. Controller 18 energizes each electromagnetic winding 164 such that the polarity of each magnetic field is opposite the polarity of the field produced by adjacent electromagnetic windings 164. The polarity of each electromagnetic winding 164 is alternated to impart rotational movement to the magnetic plates 202, 204 and impeller 168. The frequency with which the electromagnetic windings 164 are pulsed determines the rotational speed of impeller 168. The controller can pulse the electromagnets in a reversed mode to rotate the impeller in the opposite direction and draw mastic back into the container, for example, before the apparatus is powered down at the completion of an application.

Figure 10:
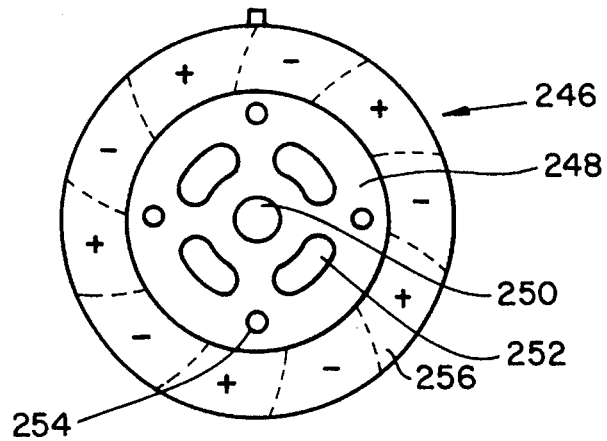
FIG. 10 is a top view of the magnetic plate in an alternative embodiment of the invention.

Referring to FIG. 10, an alternative embodiment of the magnetic plate 246 is shown including a center plate 248 having an aperture 250 for coupling with the shaft 170 of impeller 168, material openings 252 and apertures 254 for retaining pins to couple plate 248 with impeller 168. An outer magnetic plate 256 is press fitted onto centerplate 248 to define the alternating magnetic polarities.

Figure 7:
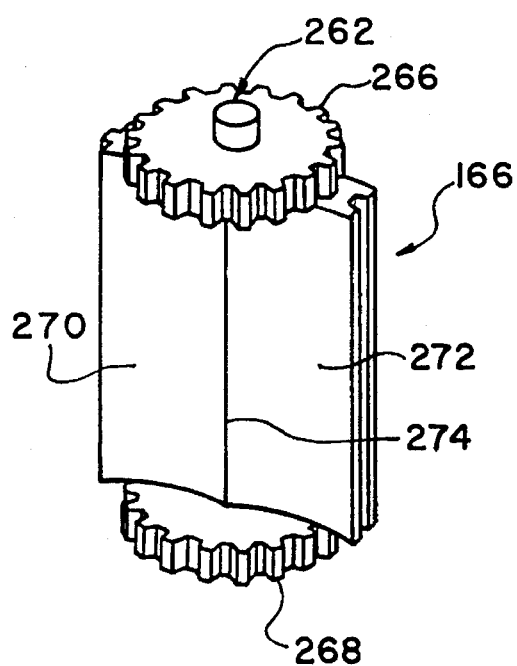
FIG. 7 is a perspective view of a pressure plate in a first embodiment of the invention.
Figure 11:
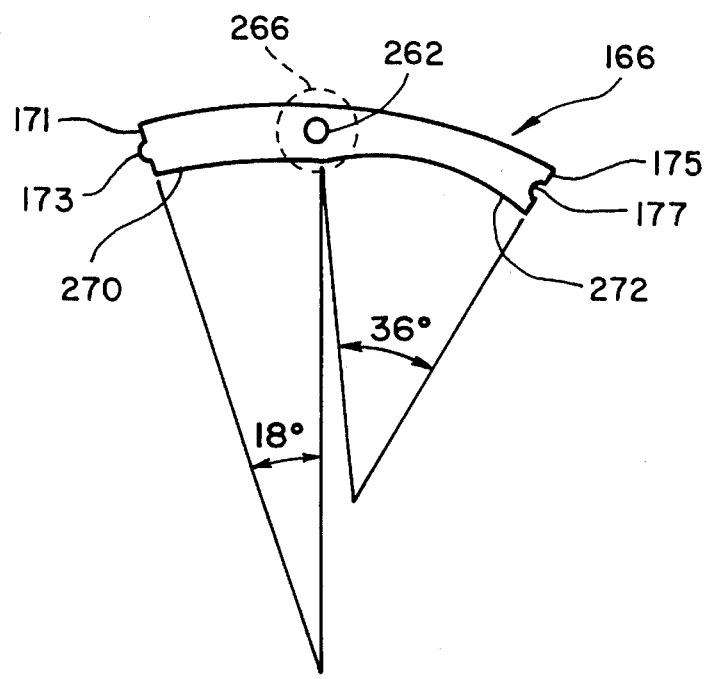
FIG. 11 is an end view of the pressure plate of FIG. 7.

As shown in FIG. 5, a plurality of pressure plates 166 are axially disposed between electromagnetic windings 164 and impeller 168. In preferred embodiments, ten pressure plates 164 are radially spaced around impeller 168 to define a pressure space 260 therebetween. Referring to FIGS. 7 and 11, each of pressure plates 166 in a first preferred embodiment of the invention have an upper axial shaft 262 and a lower axial shaft 264 extending from the main body portion to define a pivot pin for each pressure plate 166. An upper spur gear 266 is coupled to upper shaft 262 and a lower spur gear 268 is coupled to lower shaft 264. Pressure plates 164 include a first arcuate pressure face 270 and second arcuate pressure face 272 which converge along a pressure point 274 extending longitudinally to divide pressure plate 164 into substantially two equal areas. First arcuate pressure surface 270 has curvature less than the curvature of pressure surface 272. Generally, the curvature of pressure surface 272 is twice the curvature of pressure surface 278. In preferred embodiments shown in FIG. 11, first arcuate pressure surface 270 has a curvature defined by an 18° arc. Second arcuate surface has a curvature defined by a 36° arc.

Figure 12:
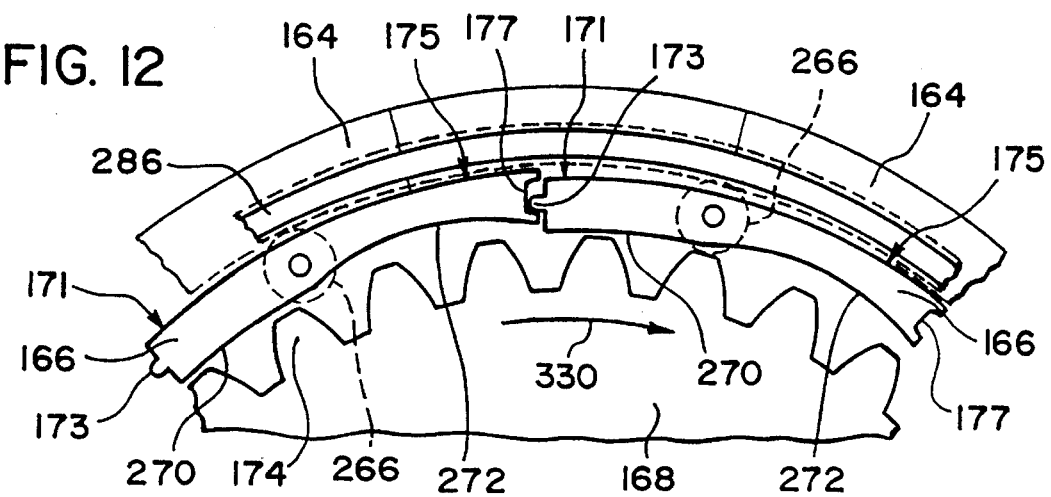
FIG. 12 is a partial end view of the pump assembly showing the impeller and the pressure plates in a first position.
Figure 13:
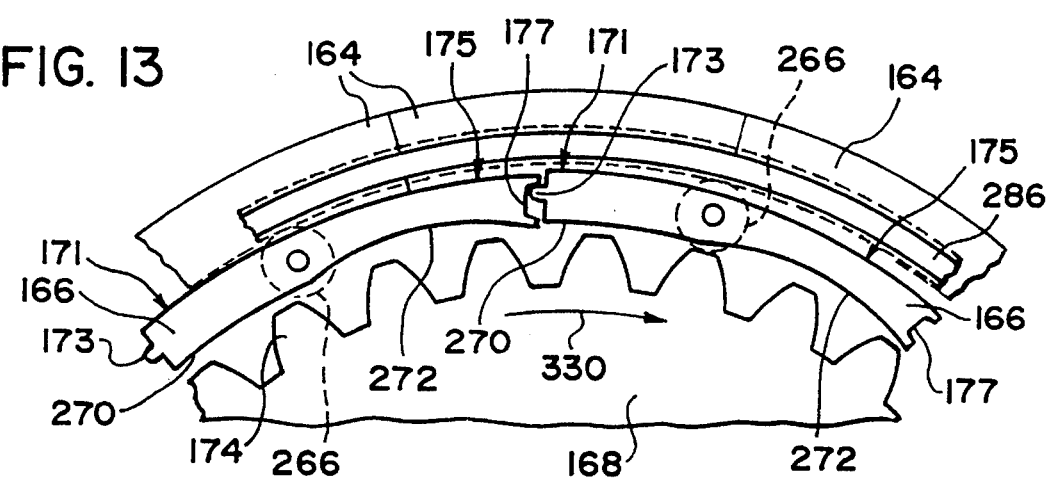
FIG. 13 is a partial end view of the pump assembly showing the impeller and the pressure plates in a second position.

Pressure plates 166 include a leading edge 171 (FIG. 12) having tongue or ridge 173 extending the full length of the pressure plate. A trailing edge 175 of pressure plates 166 include a groove 177 complementing ridge 173 and extending the length of the pressure plate. Preferably, groove 177 is dimensioned to allow limited movement of ridge 173 therein. Groove 177 is adapted for mating with a ridge 173 of an adjacent pressure plate, as shown in FIGS. 12 and 13.

Figure 8:
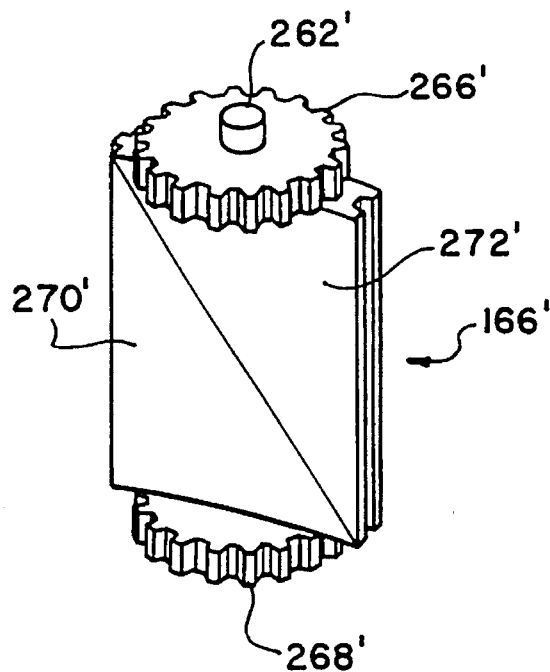
FIG. 8 is a perspective view of the pressure plate in an alternative embodiment of the invention.

In an alternative embodiment shown in FIG. 8, pressure plate 166' has two arcuate faces 270', 272' joining along a diagonal line. Arcuate face 270' is defined by 18° arc while arcuate face 272' is defined by a 36° arc. Upper and lower gears 266' and 268' are fixed to pressure plate 166' and function in the same manner as the embodiment of FIG. 7.

Referring to FIG. 5, upper axial shaft 262 of pressure plate 166 extends beyond spur gear 266 to define a mounting pin 274. Lower axial shaft 264 similarly extends beyond spur gear 268 to define a lower mounting pin 276. Upper and lower mounting pins 274', 276, respectively, are received in apertures 278 in an upper mounting plate 280 and in aperture 282 in a lower mounting plate 284. Upper and lower mounting plates 280, 284 are coupled to casing 162 to fix the radial position of pressure plates 166 within pump assembly 14 as shown in FIG. 5. The mounting plates can be made of metal or a suitable plastic material.

Figure 14:
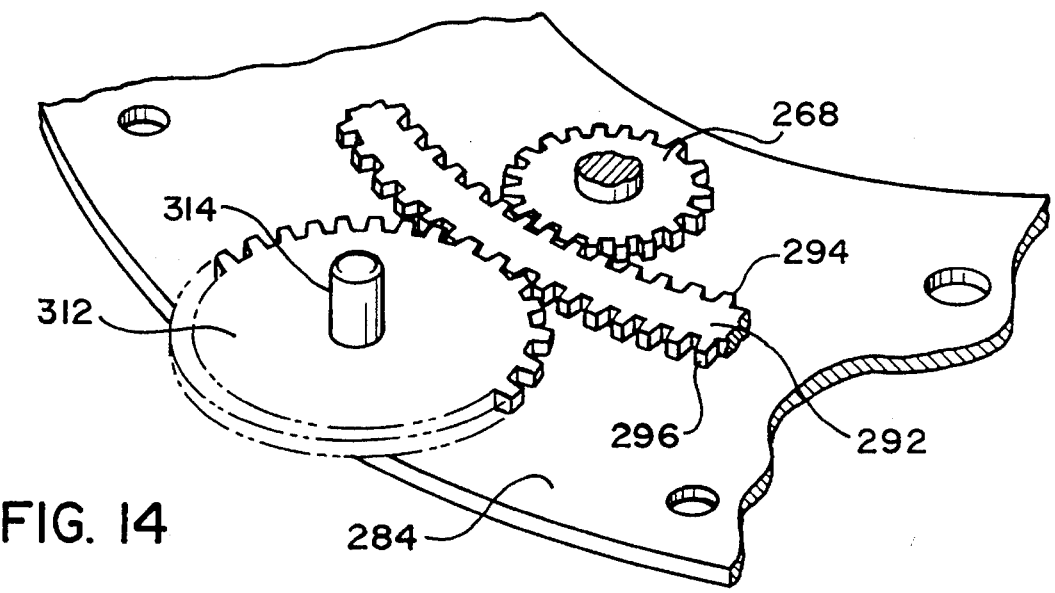
FIG. 14 is a partial top view of a lower spur gear on the pressure plate, a ring gear and a tower gear.

An upper ring gear 286 encircles each of upper spur gears 266. Ring gear 286 includes internal gear teeth 288 which mesh with the teeth on spur gears 266. Outer gear teeth 290 are also provided on the outer edge of ring gear 286. As shown in FIG. 14, an essentially identical lower ring gear 292 having inner gear teeth 294 meshes with lower spur gears 268. Low ring gear 292 also includes outer gear teeth 296 for meshing with tower gears 312.

As shown in FIG. 5, the upper and lower ends of body 242 of casing 162 include a recess 298, 300, respectively. Top 240 of casing 162 includes a recess 302 opposite recess 298. Bottom 244 of casing 162 also includes a recess 304 opposite recess 300. An upper tower gear 306 having an upper pinion 308 and a lower pinion 310 is mounted in recesses 298, 302 for rotational movement. Upper tower gear 306 meshes with upper ring gear 286. A lower tower gear 312 having an upper pinion 314 and a lower pinion 316 is rotatably mounted in recesses 300, 304 for meshing with lower ring gear 292 as shown in FIGS. 5 and 14. As shown in FIG. 5, upper and lower tower gears 306, 312 are mounted along the same axis and extend through mounting plates 280, 284 and into top 240 and bottom 244, respectively.

A drive motor 318 having an axially extending upper drive shaft 320 and a lower drive shaft 322 is mounted to body 242 of casing 162. An upper drive gear 324 is mounted on upper drive shaft 320 meshing with upper tower gear 306. A lower drive gear 326 is mounted on lower drive shaft 322 meshing with lower tower gear 312. A suitable housing 328 encloses drive motor 318 and is attached to casing 162 by suitable fastening means (not shown).

Referring to FIGS. 12 and 13, helical teeth 174 of impeller 168 are closely spaced to pressure plates 166 which encircle impeller 168. Pressure plates 166 are each mounted on upper and lower mounting plates 280, 284 for limited pivotal movement as determined by the position of upper and lower ring gears 286, 292 with respect to upper and lower mounting plates 280, 284. Rotation of impeller 168 in the direction of arrow 330 creates a high pressure zone along first arcuate face 270 and a low pressure zone along second arcuate face 272. Fluid material passing along helical teeth 174 of impeller is forced from the high pressure area of arcuate face 270 toward arcuate face 272. The relative position of each pressure plate 166 with respect to impeller 168 determines the pump pressure and output flow.

As shown in FIG. 12, pressure plates 166 are adjusted by rotating the ring gears to pivot pressure plates 166 so that arcuate face 270 is closely spaced to impeller 166 and arcuate face 272 is spaced away from impeller. In this position of the pressure plates 166 shown in FIG. 12, the pressure zone created at arcuate face 270 is significantly higher compared to the pressure zone at arcuate face 272 resulting in a high output flow. Adjusting the position of pressure plates as shown in FIG. 13 reduces the pressure difference between the pressure zones at arcuate faces 270, 272 thereby creating a lower output flow. By selectively adjusting the position of pressure plates, the output flow of material can be controlled while maintaining a constant rotational speed of impeller 168. Drive motor 318 is preferably a step motor coupled to controller 18. Drive motor 318 can be rotated in controlled increments to permit small adjustments of the position of pressure plates 166.

During initial start up of the apparatus, supply container 12 is positioned on the pump assembly 14. Controller determines the type of material in supply container 12 and selects an operating program for the material to be pumped. Controller then actuates vacuum apparatus 90 to draw a vacuum and draw material from supply container 12 into pump assembly 14. Substantially simultaneously, controller energizes electromagnetic winding 164 to cause impeller 168 to rotate at a selected constant speed. Drive motor 318 is actuated to position pressure plates 166 to determine output flow from pump assembly 14.

The material being pumped flows downwardly through throat tube 76 into rotating cone 212. The rotational movement of inlet cone 212 forces the material downward along the inclined walls of cone 212 through openings 208 in upper magnetic plate 202. The rotation of impeller 168 forces the material downwardly into upper recess 178 and outward through radial passageways 188 to pressure plates 166. Pump pressure formed between impeller 168 and pressure plates 166 force the material downwardly and through passageways 200 into lower recess 192 where the material exits through conical outlet 238 and outlet 174.

The pump assembly of the invention is particularly suitable for pumping various viscous materials, such as, for example, wallpaper adhesives, floor adhesives and wallboard joint compound. In one preferred embodiment, material being pumped is a wallboard joint compound having an improved dry time and reduced shrinkage compared with commercially available joint compounds.

The joint compound of the invention is a water based composition which contains pure gypsum plaster, an aliphatic resin glue and sufficient water to form a workable mixture. The joint compound is defined as having an absence of added alcohol such as polyvinyl alcohol or methanol and an absence of abrasive fillers such as silica, alumina or mica. Various additives can be added to improve texture, color and drying times. In embodiments, the joint compound consists essentially of pure gypsum plaster, an aliphatic resin glue and water.

The pure gypsum plaster of the invention refers to completely calcined gypsum rock in the form of substantially pure calcium sulfate, $CaSO_4$, where essentially all of the water of crystallization is driven off by heating or calcining the gypsum rock. The pure gypsum plaster contains substantially no gypsum rock, $CaSO_4 \cdot 2H_2O$ or calcium sulfate hemihydrate, $CaSO_4 \cdot \frac{1}{2}H_2O$. Conventional joint compounds use substantial portions of gypsum rock and/or the calcium sulfate hemihydrate (Plaster of Paris) which results in significant shrinkage as the composition dries. The use of pure gypsum plaster is found to eliminate the shrinkage and cratering of commercially available joint compounds. The pure gypsum plaster of the invention is available under the trade name "Hydrocal" sold by U.S. Gypsum Co.

The aliphatic resin glue is preferably a commercially available aliphatic glue capable of curing at a room temperature. Typical aliphatic resin glues contain ethylenic polymers such as polyvinyl acetate or ethylenic polyesters in combination with a suitable catalyst and stabilizers in a suitable solvent or carrier. An example of a suitable aliphatic glue is available under the trade name "Elmer's Carpenter's Glue" from Borden, Inc. Other suitable glues are the water resistant wood glues sold by Franklin International, Inc.

In preferred embodiments, the composition comprises about 50% to about 70%, preferably about 50% to about 65% and most preferably about 60% pure gypsum plaster based on the total weight of the composition. The composition further contains about 5% to about 25%, preferably about 10% to about 20% and most preferably about 15% aliphatic resin glue based on the total weight of the composition. Water is contained in the composition to obtain a smooth pumpable texture. Generally water is present in the amount of about 15% to about 30% and preferably about 25% by weight based on the total weight of the composition. The composition generally includes water as the sole solvent or carrier. The drying time of the composition can be selectively adjusted by altering the amount of water and the aliphatic resin glue in relation to the amount of pure gypsum plaster. Reducing the amount of water reduces the drying time while providing a thicker slurry. The drying time also can be reduced by increasing the amount of the aliphatic resin glue.

The hardness of the dried composition can be altered by adjusting the proportions or ratio of the components. For example, a harder surface can be produced by increasing the amount of pure gypsum plaster and reducing the amount of glue. Soft or textured finishes can be produced by the use of particulate fillers or additives, such as for example, talc or soapstone. Although generally less preferred, other fillers can include pumice, mica, silica sand or alumina. The additives are generally included in the amount of about 5% by weight.

In embodiments, the composition can contain up to about 1.5% by weight of a dye or pigment as a coloring agent. Generally the coloring agent is a colored chalk or latex dye.

In embodiments of the invention, dispensing head 16 is adapted for applying joint compound to a wallboard joint. Referring to FIGS. 15–19, dispensing head 16 includes a handle 334, a body 336, a wallboard tape supply 338 and tape cutter 339. Handle 334 has an axial supply conduit 340 therein. One end of supply conduit 340 has a fluid coupling 342 for coupling by the supply tube 20 to pump assembly 14. An electrical connector 344 is also provided on handle 334 for connecting with controller 18. An operator actuator switch 416 is mounted on handle 334 connected to electrical connector 344 to operate controller 18.

Figure 15:
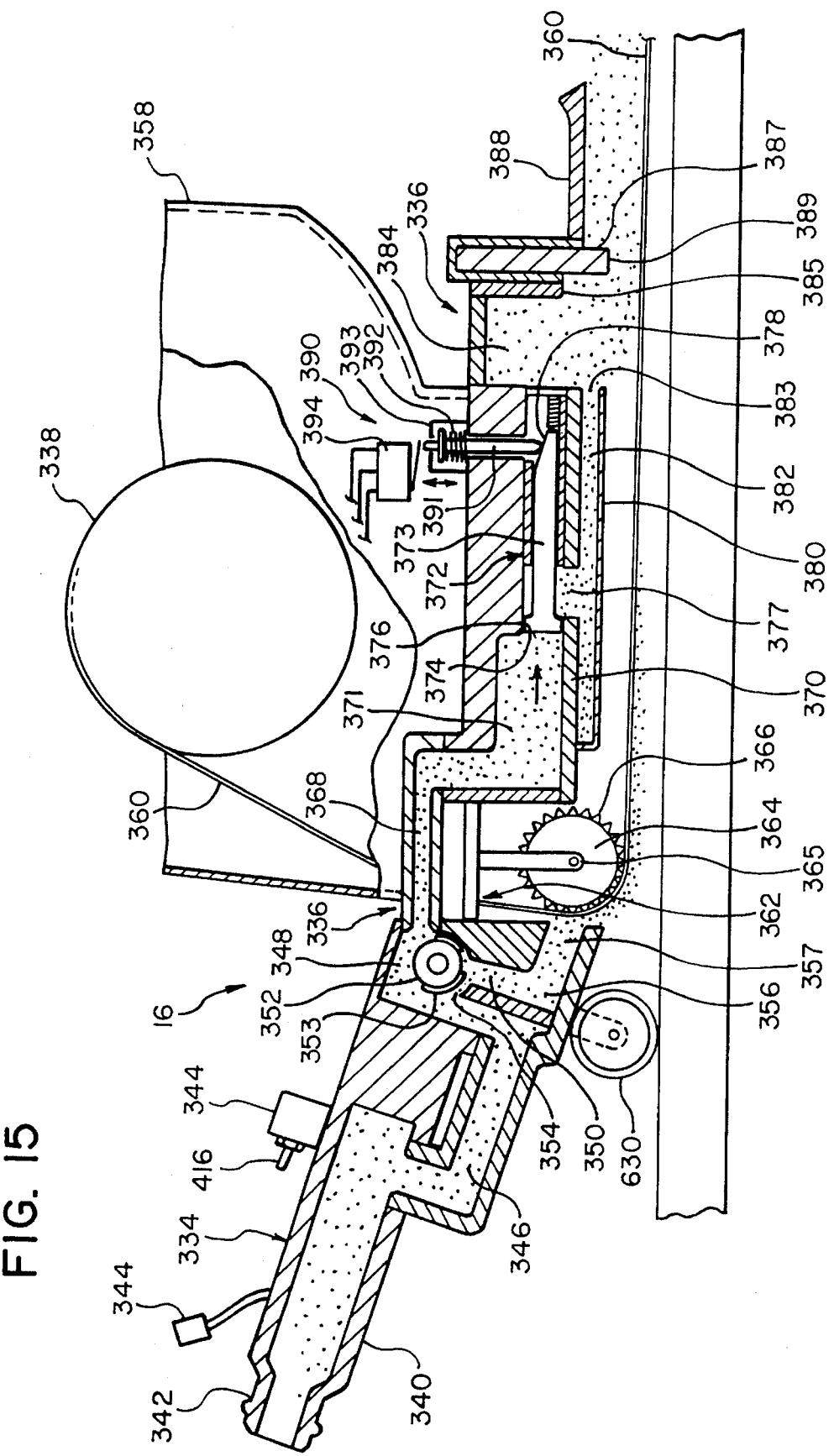
FIG. 15 is a cross-sectional view of the dispensing head in one embodiment of the invention showing the flow paths and a pressure switch assembly.

Referring to FIG. 15, body 336 of dispensing head 16 includes an inlet passage 346 connected to supply conduit 340 for receiving joint compound from the supply tube 20. Inlet passage 346 joins with an upper passage 348 and a lower passage 350. An adjustable diverter valve 352 is provided at the receiving end of lower passage 350 to control the amount of joint compound being delivered to lower passage 350. Valve 352 is adjustable from a full open position to a full closed position to control selectively the amount of joint compound passing to lower passage 350. As shown in FIG. 15, diverter valve 352 is a manually operated rotating C-type valve having a valve face 353 for mating with a valve seat 354. In alternative embodiments, other types of flow regulating valves can be used as well known in the art. Although in preferred embodiments diverter valve 252 is manually adjusted, the valve can be electronically controlled.

Figure 16:
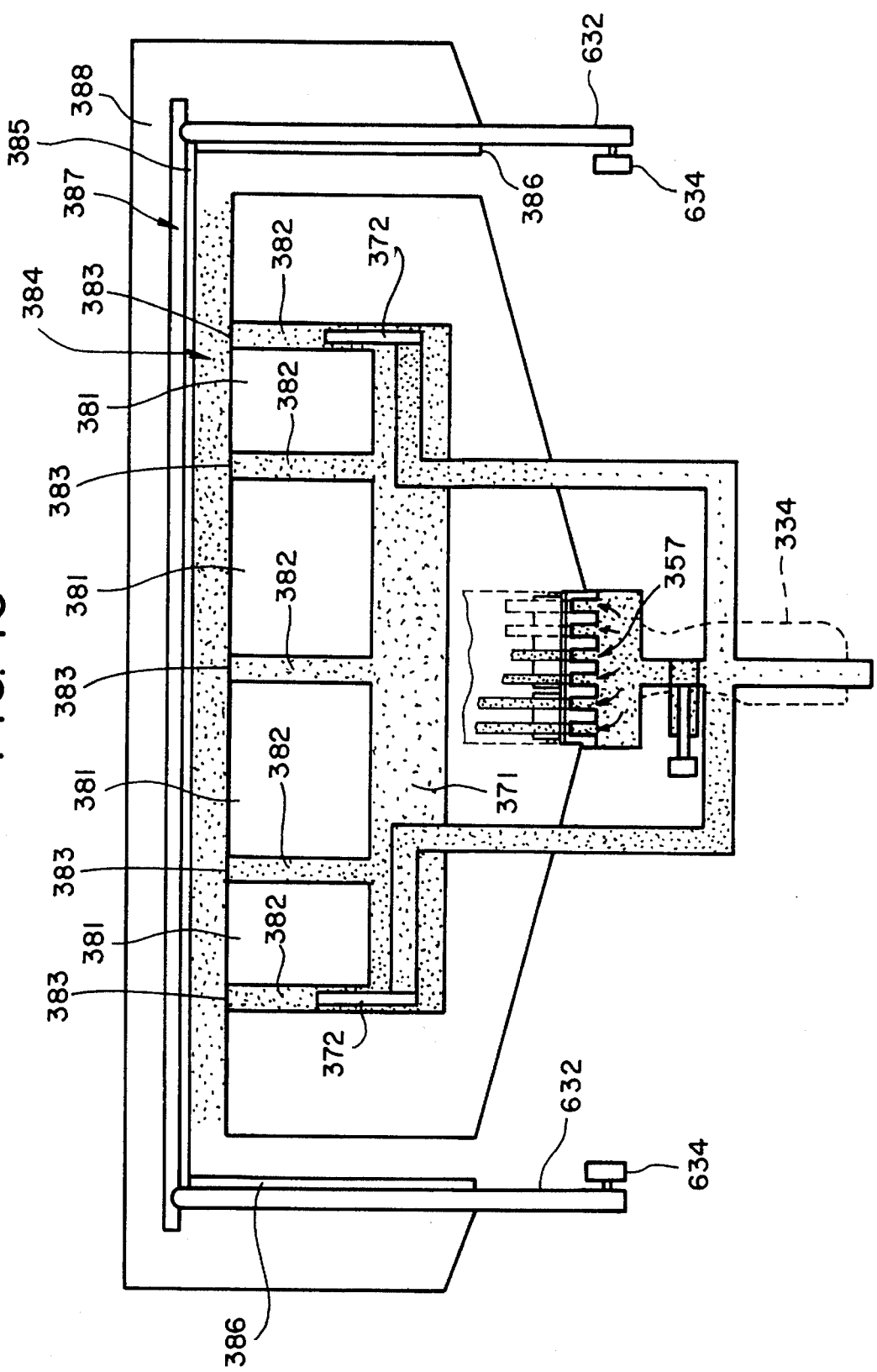
FIG. 16 is a schematic top view of the dispensing head showing the flow paths of the material being pumped.

Lower passage 350 extends through body 336 to a lower chamber 356. Lower chamber 356 has a width about equal to the width of standard drywall joint tape. A plurality of fluid outlets 357 extend from lower chamber 356 to dispense the joint compound. As shown in FIG. 16, six fluid outlets 357 are provided, although the actual number of outlets is not critical to the operation of the tool, provided sufficient joint compound is supplied under drywall tape to properly adhere the tape to the wallboard surface.

Figure 17:
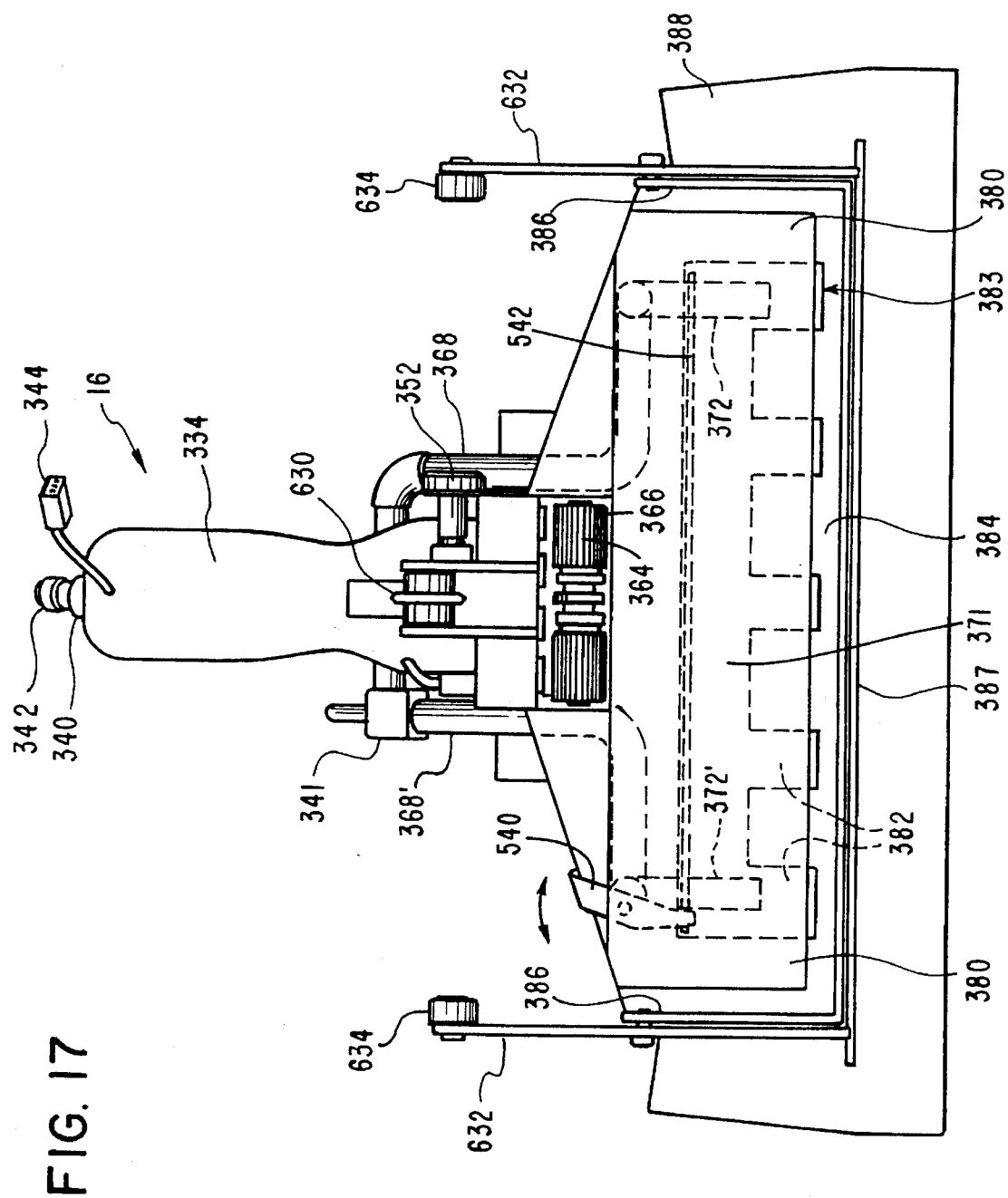
FIG. 17 is a bottom view of the dispensing head in a first embodiment showing the material outlet, smoothing plate and doctor blade.

Body 336 is provided with a tape supply housing 358 for receiving a roll of standard joint tape 360. Tape 360 is fed through opening 362 and around rollers 364 mounted to body 336 where tape 360 is applied to a wallboard surface. As shown in FIG. 15, tape rollers 364 are closely spaced to fluid outlets 357 so that the joint compound is dispensed directly onto one side of tape 360 as it passes over rollers 364 and onto the wallboard surface. In preferred embodiments, three rollers 364 are mounted on a single transverse axle 365 which is mounted on body 336 and parallel to the bottom of body 336. Rollers 364 preferably include a plurality of teeth 366 or grooves for gripping tape 360 and for applying pressure to tape 360 as it is applied to the wallboard surface. In embodiments of the invention, rollers 364 are spring biased away from body 336 to accommodate for imperfections in the wallboard and apply a uniform pressure to tape 360. As shown in FIG. 17, the two outer rollers 364 are wider than the center roller.

Upper passage 348 can also include an optional flow control valve (not shown) to control selectively the amount of joint compound passing therethrough. Upper passage 348 diverges into two passages 368,368' which extend forward with respect to body 336 and terminate at a bottom plate 370. Identical pressure operated valve assemblies 372,372' are provided at the terminal end of each of passages 368,368' to control the flow of compound into main fluid chamber 321. Each valve assembly 372,372' includes a valve body 373 having a valve face 374 at a forward end and a spring 375 to bias valve body 373 forward in a normally closed position. Valve face 374 mates with a valve seat 376 of valve assembly 372. Bottom plate 370 includes an aperture 377 on the downstream side of valve body 373 defining a fluid outlet for the joint compound. As shown in FIG. 15, valve body 373 is mounted for reciprocating movement in a plane parallel to bottom plate 370. Valve body 373 includes a rear end having an inclined camming surface 378 as shown in FIG. 15 for actuating pressure sensor 390. A manual lever 540 is provided to pivot a slidable gate valve 542 to control the flow of joint compound into valve assembly 372.

A smoothing plate 380 is coupled to bottom plate 370 to define a main fluid chamber 371 below valve assemblies 372,372'. As shown in FIG. 16, main chamber 371 is connected to each flow passage 368,368' and receives a flow of joint compound from each flow passage. Smoothing plate 380 extends substantially across the working width of head 16. Bottom plate 380 also includes a plurality of spaced apart blocks 381 to define a plurality of forwardly extending outlet passages 382 forming outlets 383 to an accumulation chamber 384. Accumulation chamber 384 is formed by front wall 385 and side walls 386 of body 336 and extends the full width of body 336. As shown in FIG. 15, accumulation chamber 384 is open downwardly to dispense the joint compound onto the wallboard surface. A vertical doctor blade 387 is coupled to front wall 385 and extends the full width of body 336. A horizontal smoothing knife 388 extends perpendicular from doctor blade 387 parallel to the wallboard surface for smoothing the joint compound. As shown in FIG. 15, smoothing knife 388 is spaced upwardly from the face 389 of doctor blade 386 although in embodiments smoothing knife 388 is positioned at the face 389. As shown in FIG. 17, smoothing knife extends along sidewalls of body 336.

Referring to FIG. 17, a center guide roller 630 extends from the bottom of dispensing head 16. Guide roller 630 is adapted for riding in the joint or recess between two adjacent sections of wallboard to guide the head 16 along the joint in a straight line. A pair of stabilizer arms 632 are pivotally mounted on opposite sides of head 16. A first end of arms 632 include a guide wheel 634 for rolling against the wallboard surface to accommodate for uneven surfaces. The opposite end of arms 632 engage grooves in doctor blade 387. Arms 632 pivot independently of doctor blade 387.

Body 336 further includes a pressure switch assembly 390, operatively connected to each valve assembly 372,372'. Each pressure switch 390 includes a plunger 391 biased downwardly into contact with cam surface 378 of valve 373 by spring 392 mounted within housing 393. A time clock generator switch 394 is operatively connected to plunger 391. Switch 394 is electrically connected to connector 344 and controller 18 to control pump assembly 14 as discussed hereinafter in greater detail.

In operation of dispensing head 16, pump assembly 14 is actuated to supply joint compound under pressure through supply conduit 340 in handle 334. Diverter valve 352 is selectively adjusted to allow a predetermined amount of joint compound to flow through lower chamber 356 and outlets 357 for applying beads of joint compound to one side of joint tape 360 passing over rollers 364. As dispensing head 16 is passed over the wallboard, tape 360 is applied thereto and adhered by the beads of joint compound. As the operator applies pressure toward the wallboard surface, rollers 364 spread and smooth the beads of joint compound to form a continuous layer of joint compound between tape 360 and the wallboard surface.

Simultaneously with application of the joint compound and tape 360 to the wallboard, joint compound is pumped under pressure through upper passage 348 to flow passages 368,368' to valve assemblies 372,372'. Fluid pressure urges valve body 373 away from valve seat 376 to allow the joint compound to pass through aperture 377 to main chamber 371 and through outlet passages 382 to accumulation chamber 384 where the joint compound is applied onto the tape 360 and wallboard surface. The sliding movement of dispensing head 16 causes doctor blade 387 and smoothing knife 388 to uniformly spread and smooth the joint compound in a single motion.

Figure 18:
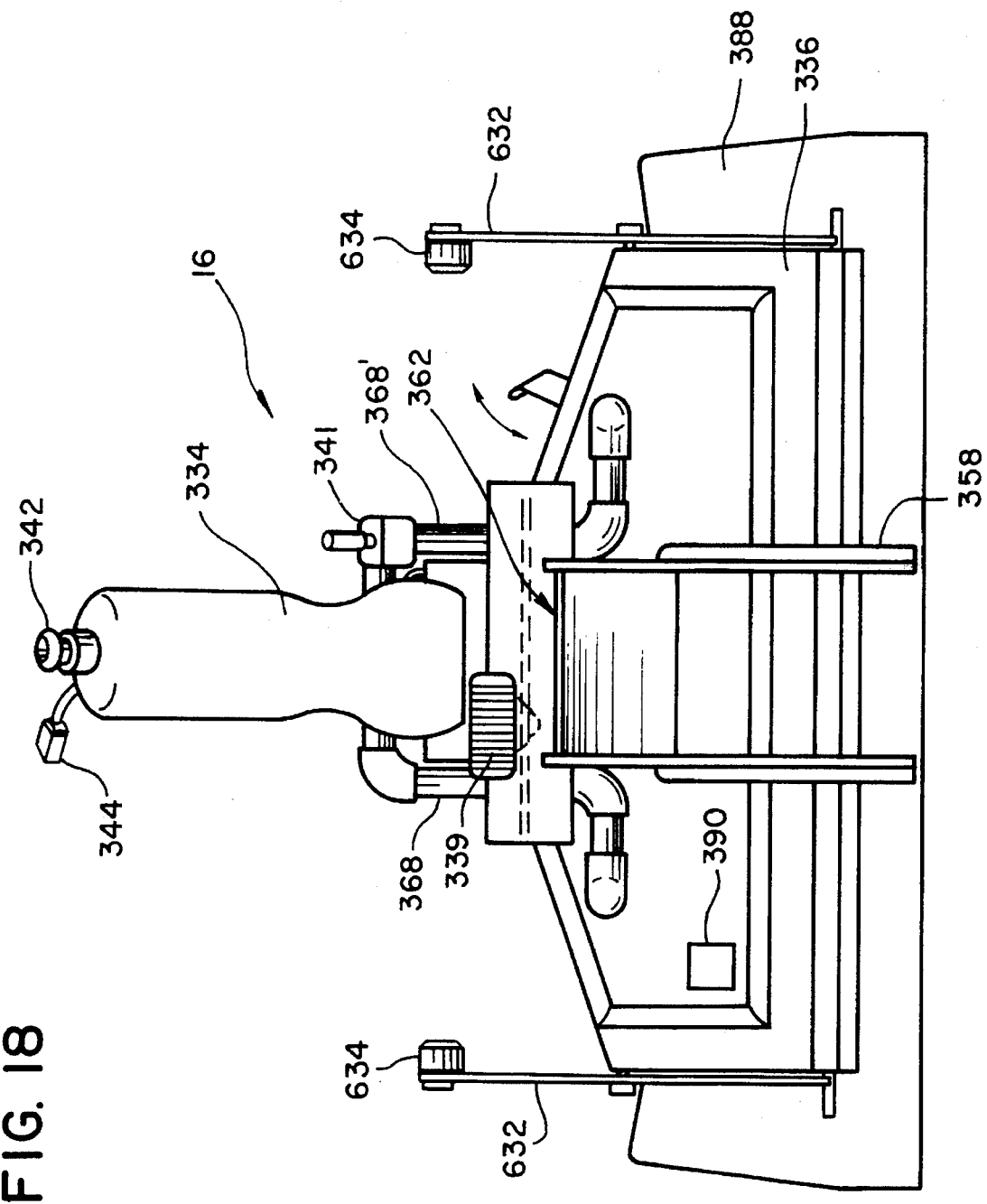
FIG. 18 is a top view of the dispensing head of FIG. 17.
Figure 19:
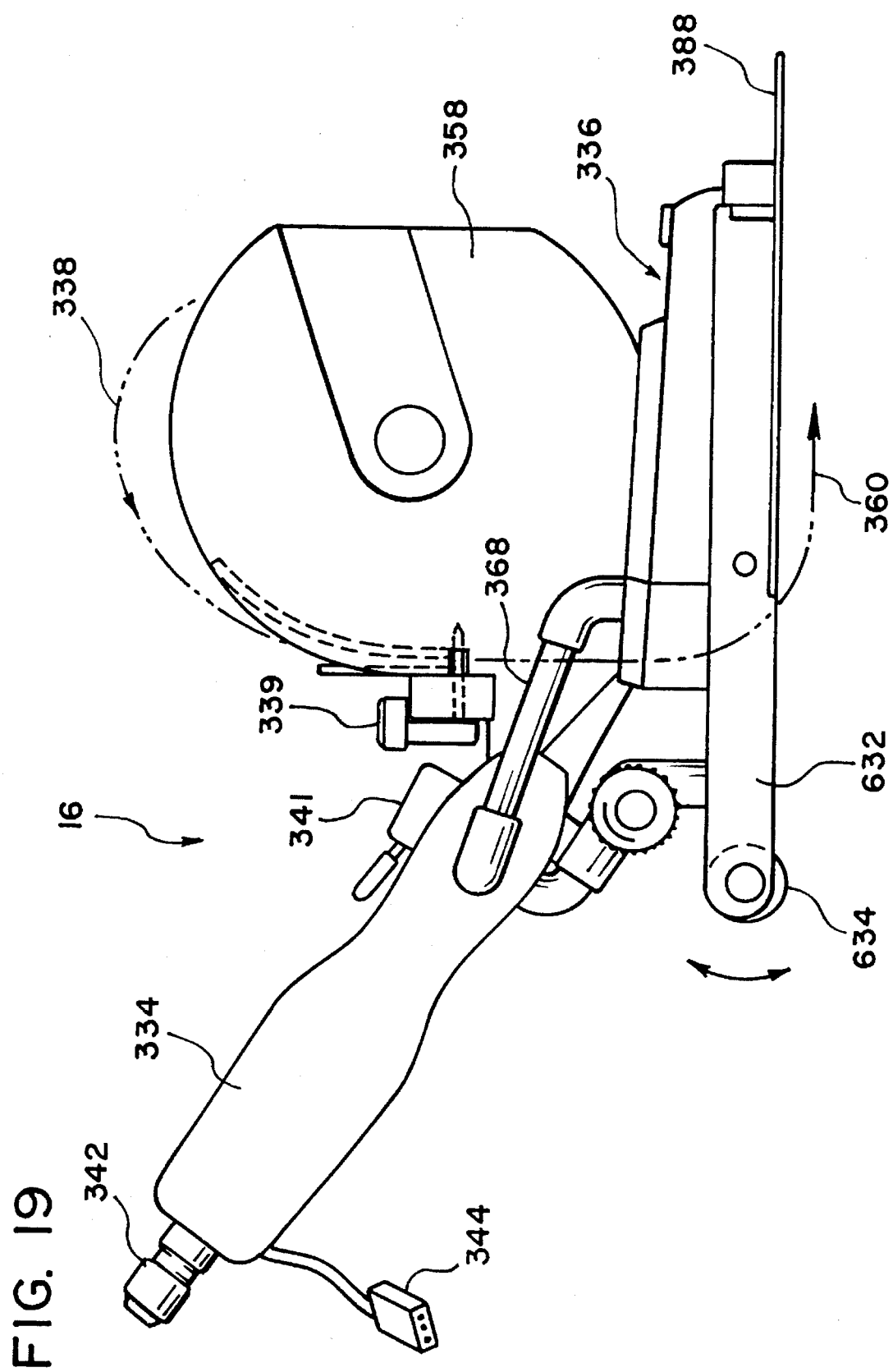
FIG. 19 is a side view of the dispensing head in the embodiment of FIG. 17.
Figure 20:
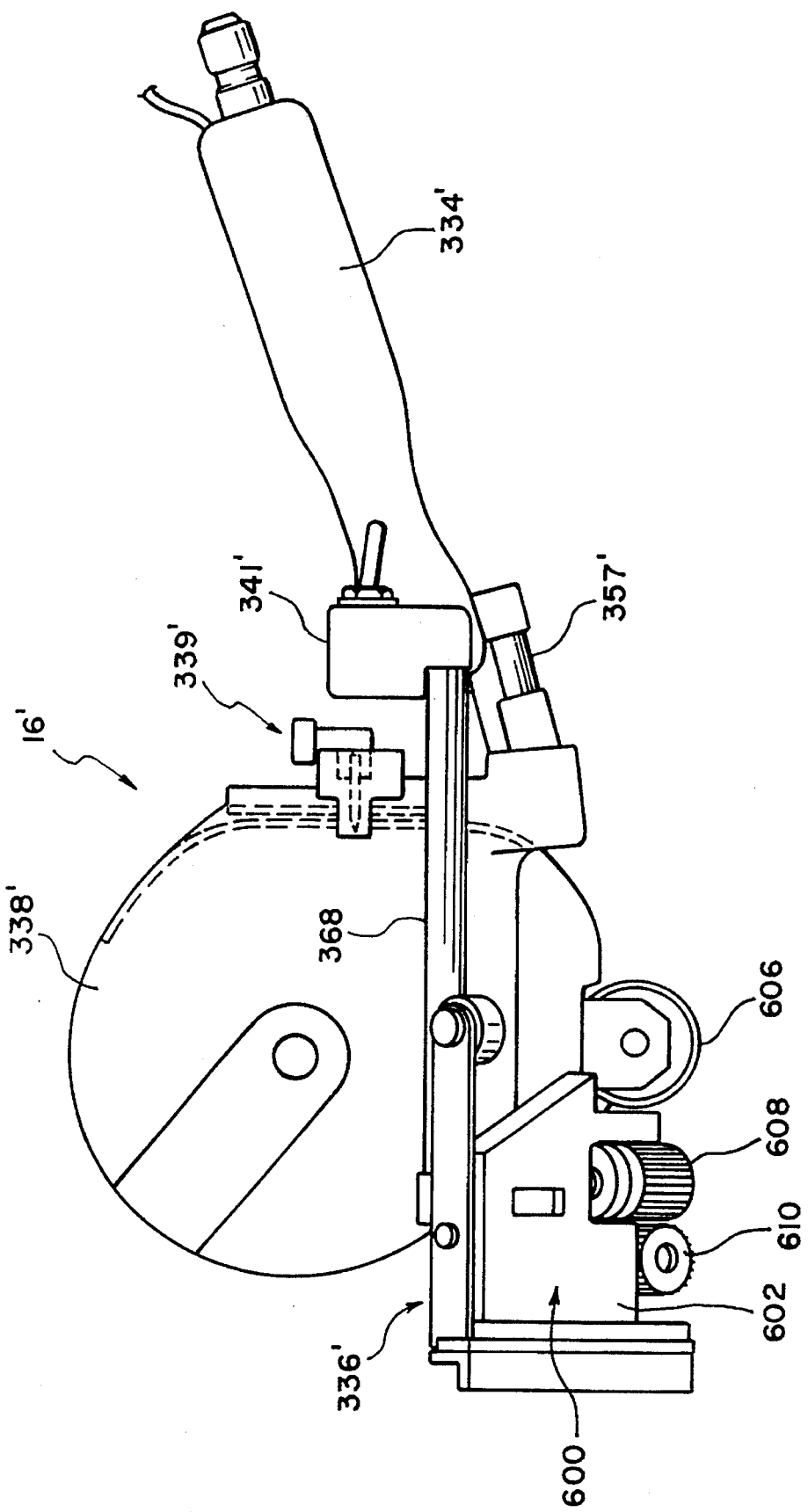
FIG. 20 is a side view of the dispensing head in an alternative embodiment having a V-shaped bottom surface for applying material to a corner.
Figure 21:
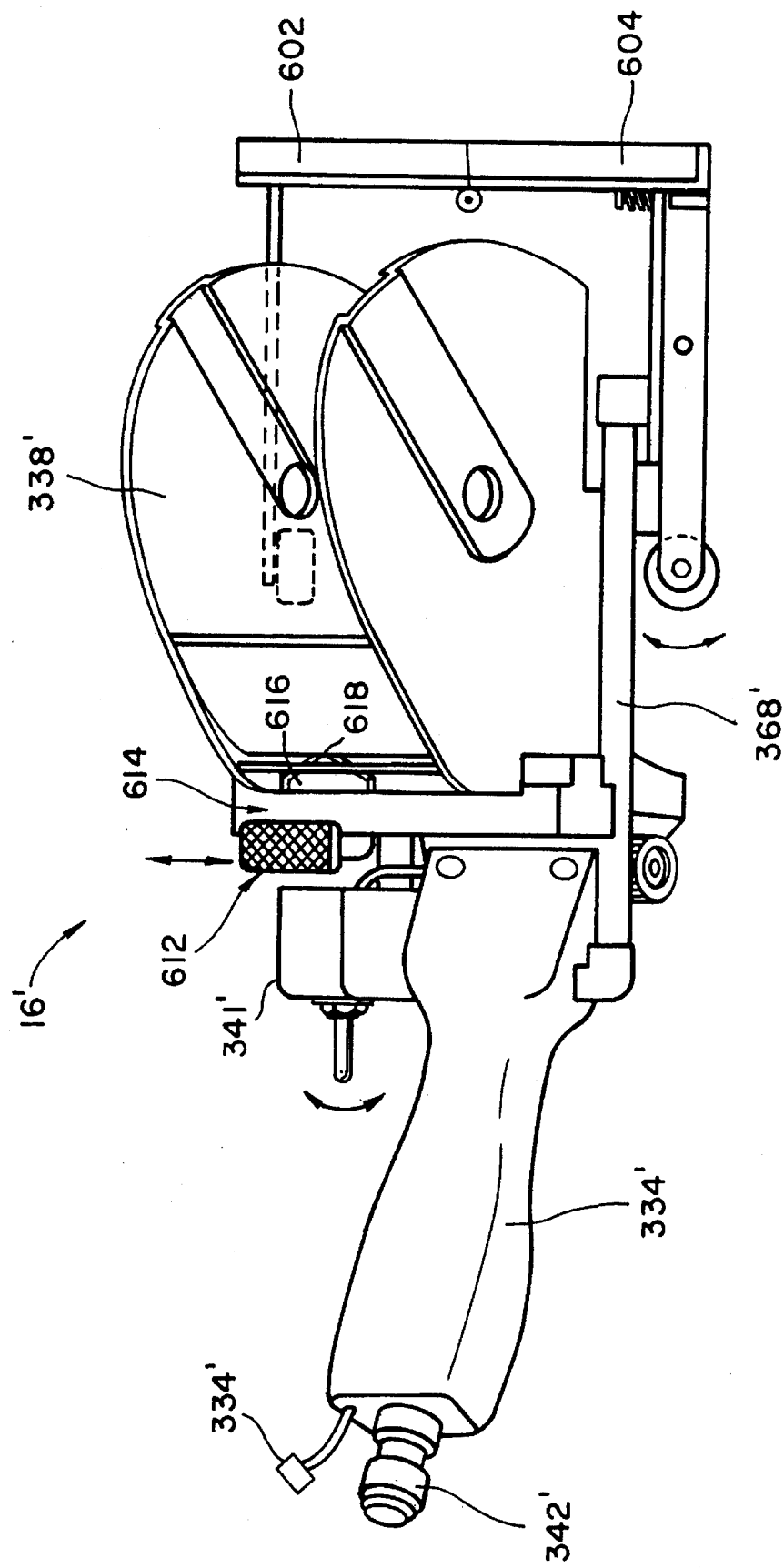
FIG. 21 is a perspective view of the dispensing head of FIG. 20.

In further embodiments, the dispensing head is adapted for applying wallboard tape and joint compound to a corner joining two sections of wallboard. As shown in FIGS. 20 and 21, dispensing head 16' is substantially the same as in the embodiment of FIGS. 15 and 16 except for the smoothing plate 600 being defined by a pair of plates 602,604 perpendicular to each other. Preferably, plates 602,604 are joined to allow limited pivotal movement with respect to each other to accommodate uneven surfaces of the wallboard. Identical elements of the embodiments of FIGS. 17 and 18 are identified by identical reference numbers with the addition of a prime.

Referring to FIG. 20, dispensing head 16' includes a center guide wheel 606 for guiding the head along the corner of the wallboard. Joint tape 360' feeds from housing 358' through opening 362' and over rollers 608,610. Rollers 608 and 610 are positioned perpendicular to each other and disposed in a plane parallel to plates 602,604. The use and operation of dispensing head 16' is substantially the same as in the embodiments of FIGS. 15 and 16.

As shown in FIG. 21, cutter 339 is a manually operated knife blade 612 mounted in a horizontal track 614. Knife blade 612 extends through track 614 for sliding movement transversely across the tape 360 in a cutting motion. Knife blade 612 includes two angled cutting edges 616 converging to a point 618 so that blade 612 is able to cut the tape by sliding in either direction.

Figure 22:
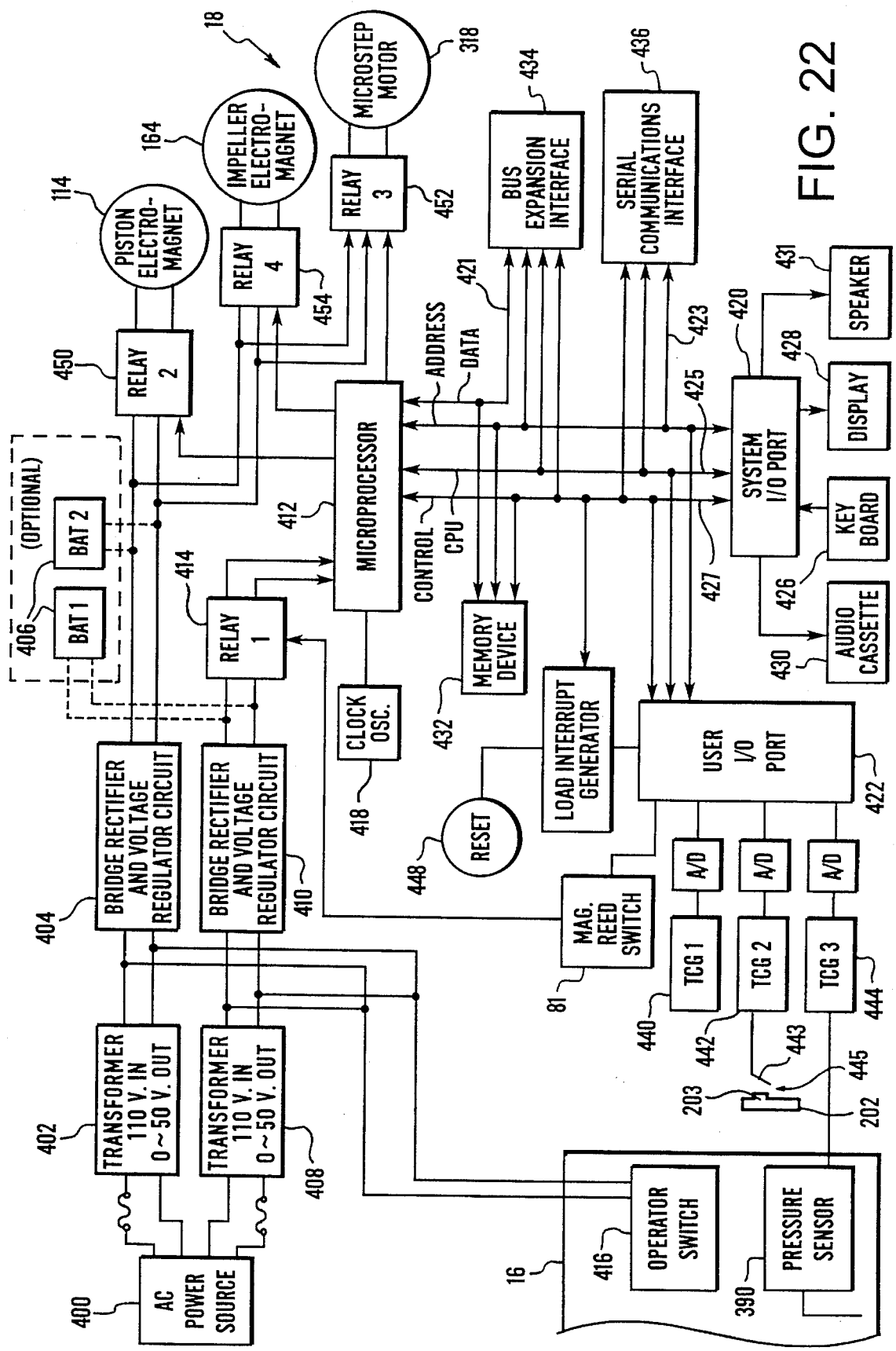
FIG. 22 is a schematic block diagram of the controller for the pump apparatus constructed in accordance with a preferred embodiment of the present invention.

The electronic and electrical components of the controller 18 are depicted in FIG. 22 An AC power source 400 preferably provides a 12 volt DC (VDC) signal to the electromagnetic coil of the piston 98 and to the helical windings associated with the electromagnets 164 of the impeller 168 via a transformer 402 and a bridge rectifier and voltage regulator circuit 404. The AC power source 400 also supplies a 5 VDC signal power to the microprocessor 412 via a transformer 408, a bridge rectifier and voltage regulator circuit 410, and a first relay 414. An operator switch 416 is provided on the dispensing head 16 to control the application of power from the AC power source to the respective bridge rectifier and voltage regulator circuits. In accordance with one embodiment of the invention, the pumping apparatus 10 can be plugged into a conventional wall outlet. In accordance with another embodiment of the invention, the controller 18 circuitry depicted in FIG. A can be mounted in a backpack to be worn by the user of the pumping apparatus and supplied with power from batteries 406.

The microprocessor 412 is preferably a conventional 16-bit processor such as a TMS 9901 processor manufactured by Tandy Corporation. Other 16-bit microprocessors can be substituted therefor. The microprocessor 412 can receive interrupt commands from as many as eight different address registers, which is preferable to an 8-bit microprocessor which uses only an 8-bit interrupt signal on a single address line. The microprocessor receives a clock signal from an oscillator circuit 418. The microprocessor is connected to a bus expansion interface 434, a system input/output (I/O) port 420 and a user I/O port 422 via a central processing unit (CPU) bus 427. An optional keyboard 426 and display 428 can be connected to the system I/O port 420. The keyboard is used for inputting program instructions, assembler commands, and data into a memory device 432 and input and output (I/O) devices. The display can be used to display keyboard inputs, program code and data. Further, an optional audio cassette interface 430 can be connected to the system I/O port 420 for storing or recalling programs or data. The microprocessor can also drive a sound disc 431 via the system I/O port.

Program code for the microprocessor 412 is stored in the memory device 432 which preferably comprises a 4 kilobyte erasable programmable read-only memory (EPROM) and a 1 kilobyte random access memory (RAM), and is connected to the microprocessor and other components via data, address and control buses 421, 423 and 425, respectively. A serial communications interface 436 is connected to the microprocessor via the address, CPU and control buses 423, 425 and 427 to operate as a serial data interface to an external EIA terminal (not shown) for keyboard entry and printing output. The user I/O interrupt port 422 is also connected to a load interrupt generator 438. The user I/O interrupt port provides interrupt signals from the load interrupt generator to the microprocessor on the CPU bus 425 in response to data signals received from any of three time clock generators 440, 442 and 444 or from the magnetic reed switch 81. The load interrupt generator 438 generates an interrupt signal on the control bus 427, when, for example, TCG output signals indicate that the container has not been inserted in the inlet cone 64, or there is a hole in the discharge tube. An interrupt can also be generated when a power reset button 448 is depressed.

The microprocessor 412 controls the piston electromagnetic coil 114, the microstep motor 318 and the helical windings for driving the electromagnets 164 of the impeller by activating second, third and fourth relays 450, 452 and 454, respectively. As will be described in further detail below in connection with the flow chart in FIG. B, data concerning the speed of the impeller 168, the flow rate of the mastic as determined by the position of the wear plates with respect to the impeller, and the thickness of the mastic being pumped is derived using signals from the first, second and third time clock generators. A template program for the mastic being pumped is stored in the EPROM portion of the memory device 432. A comparator program in the memory device 432 compares output signals from the three time clock generators with template program values to determine if pump internals, e.g., the helical windings associated with the electromagnets 164 or the microstep motor 318, need to be modified. Corrections are made until the signals from the time clock generators correspond to values stored in the template program, or a system malfunction has occurred.

The time clock generators are preferably programmable, multi-function digital time relay/counters, model no. 12 VDC CNT-35-26, available from Potter and Brumfield, a Siemens company located in Princeton, Ind. The operator switch is preferably a double-pole double-throw type relay. The magnetic reed switch is preferably a model FP-7628 switch available from Aromat Corporation of 629 Central Avenue, Edison, N.J. The first relay 414 is preferably a model no. LR26550 relay available from Nais. The second, third and fourth relays 450, 452 and 454, respectively, are each DS-C unit relays, model no. RND-C-SU, also available from Nais. The magnetic windings in the piston are preferably a Delta Max model available from Arnold Manufacturing Company of Edison, N.J. Finally, the microstep motor is preferably a DC motor model No. 3M15MO12P1 available from Sterling Instrument Co., New Hyde, N.J.

Figure 23A:
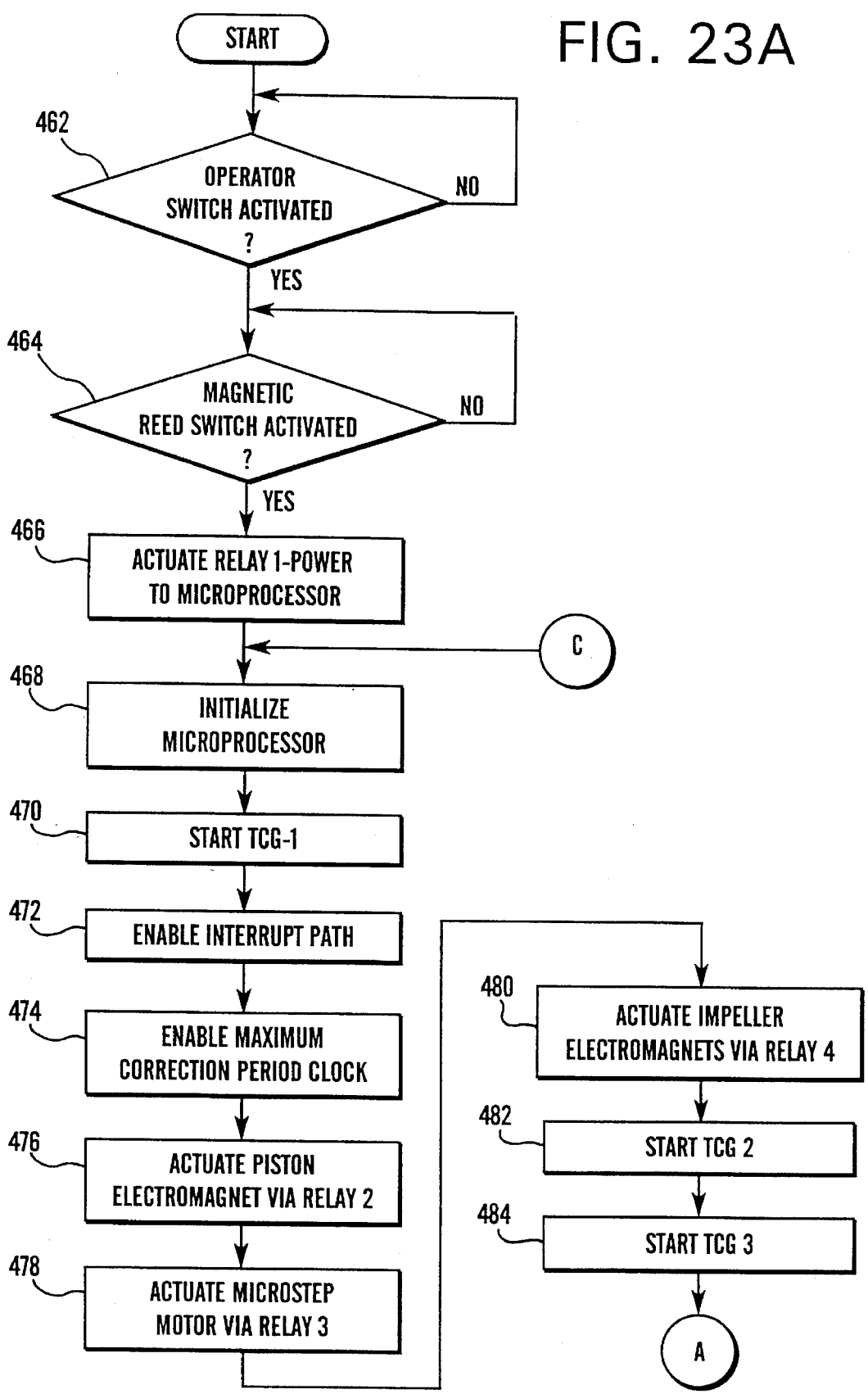
FIGS. 23A, 23B and 23C are a flow chart depicting a sequence of operations for controlling the pumping apparatus in accordance with a preferred embodiment of the present invention.
Figure 23B:
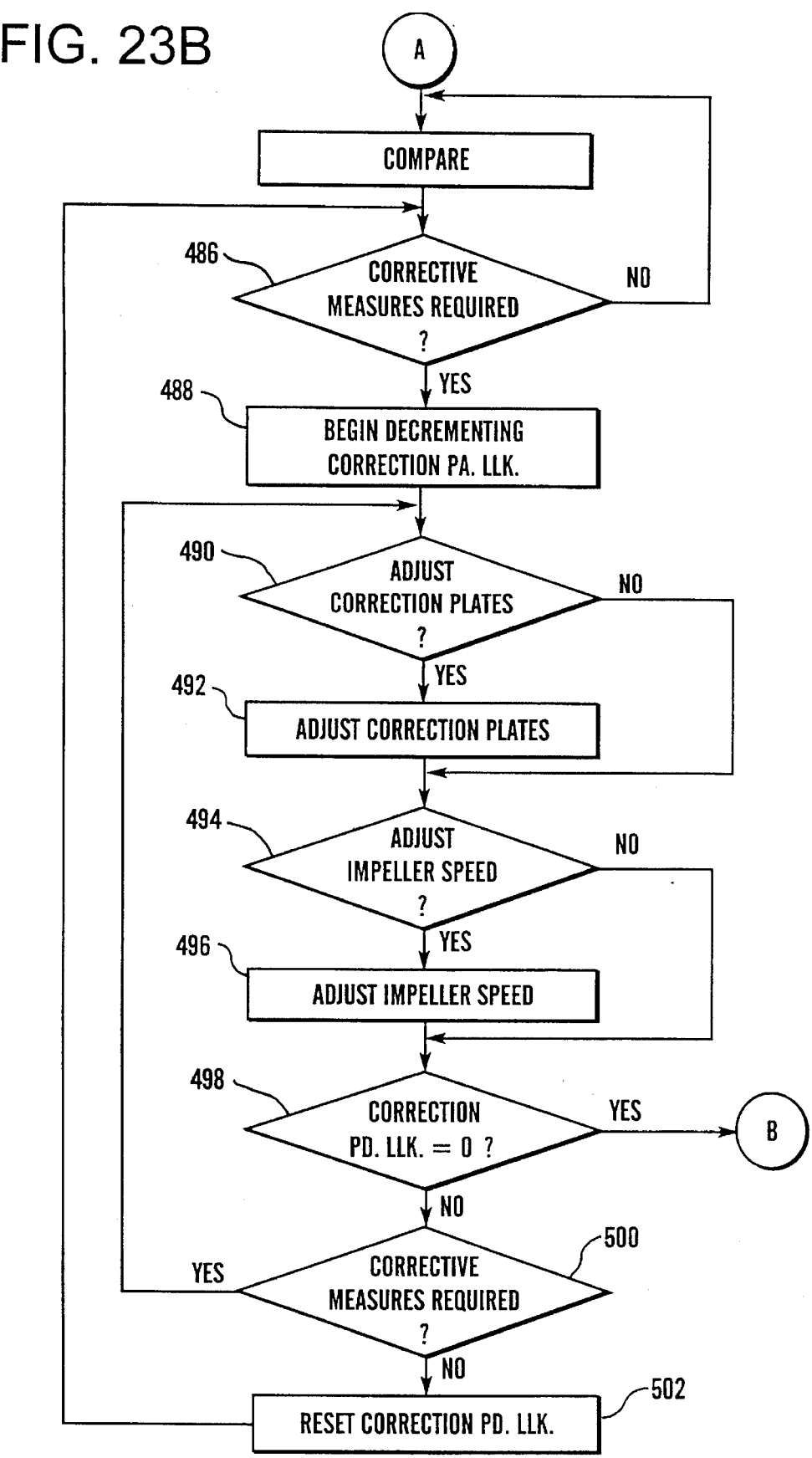
Figure 23C:
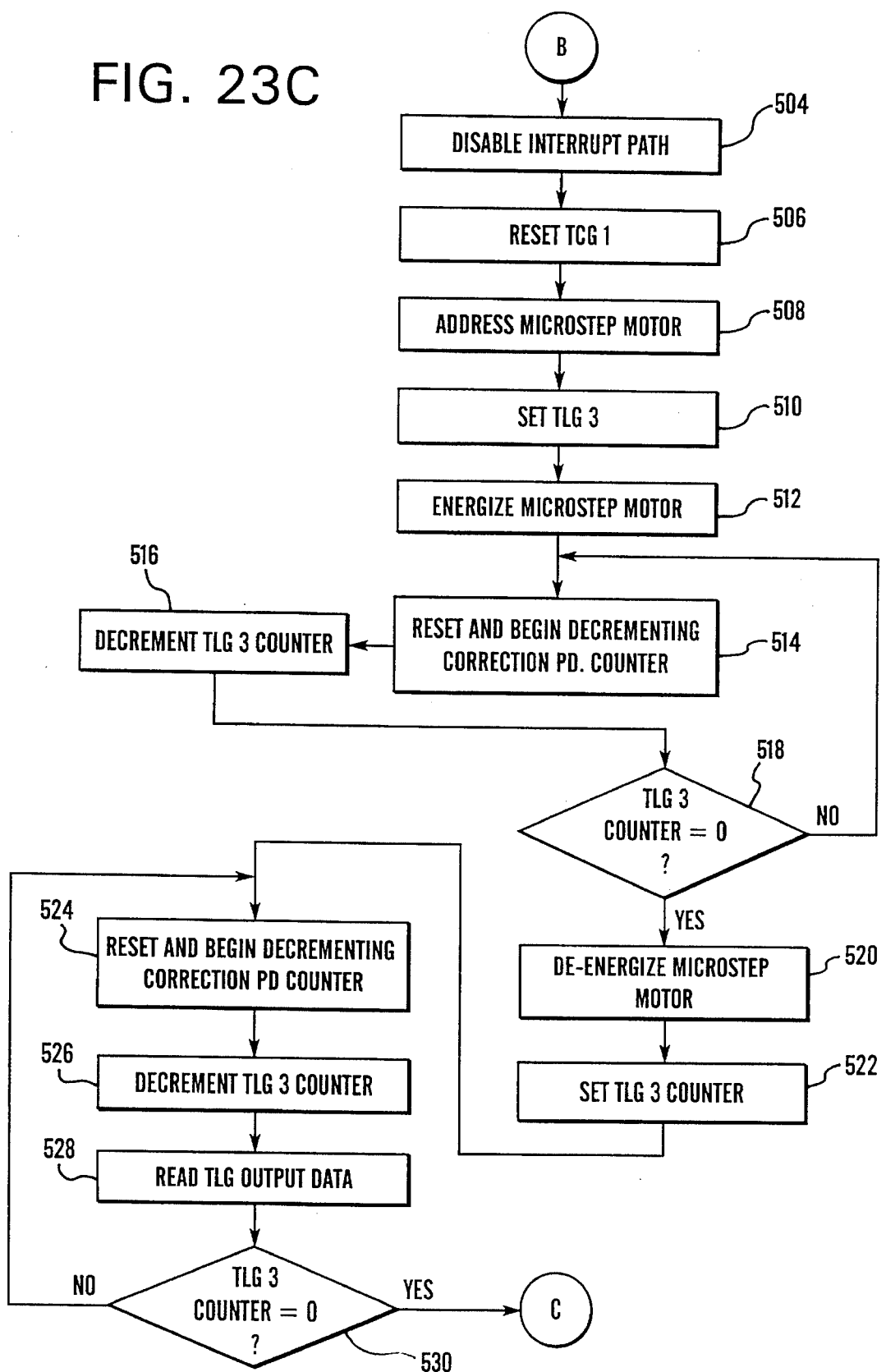

With reference to the flow chart in FIG. 23, relay 1 is not activated (block 466) until the magnetic reed switch 81 and the operator switch 416 on the dispensing head 16 are thrown (blocks 462 and 464). As stated previously, each container is provided with a rubberized magnetic strip. The strips are characterized by different levels of magnetism measured in units gauss corresponding to different types of mastic in the containers. The inlet cone gasket comprises a plurality of magnetic reed switches arranged along the inner periphery thereof. Each reed switch responds to a relatively precise amount of magnetic attraction. Thus, when the container is inserted into the inlet cone gasket, one of the magnetic switches in the gasket is thrown in response to that particular gauss reading. The magnetic reed switch is preferably a binary enable type switch which causes the microprocessor to run a program stored in the memory device 432 as long as the switch is on, that is, the strip on the container is in contact with the inlet cone gasket.

With continued reference to the flow chart in FIG. B, the microprocessor is initialized (block 468). During initialization, the microprocessor is provided with preprogrammed optimal values for the three TCGs in a template program stored in the memory device 432. The values correspond to the type of mastic in use as determined by the gauss level on the magnetic annular ring of the container. For example, the value for the TCG 2 is initialized to a corrected time value, which corresponds to the type of mastic in use, from a range of values, i.e., −5 through +5. If the TCG 2 is set to a +3, the correction plates are set to a steeper angle than if the TCG 2 were initialized at zero. Correspondingly, the correction plates are initialized at a smaller angle if the time value is set at −3 that if it were set to a neutral value such as zero.

With continued reference to block 468, the microprocessor adjusts preset time values and sets interrupt positions. For example, the microprocessor is programmed to vary the periods during which it will disable or enable interrupt signals on bus 425. If a particular type of high viscosity mastic is being used which is characterized by a relatively high solid coagulant content, the period during which interrupt signals are disabled can be shortened, as compared to the period used for a mastic with lower viscosity. This is because the system is more likely to be malfunctioning if the TCG values are offset from the programmed values. Interrupt positions refer to registers from which the microprocessor can retrieve data for comparison purposes, as well as registers containing memory locations of appropriate correction sub-routines. The microprocessor jumps to the appropriate correction sub-routine when an interrupt occurs.

With reference to block 470, the first TCG 440 is commanded under program control to begin generating pulses. The rate of time pulse generation is determined in accordance with the value of a pull-up resistor associated with the TCG 1. For example, the TCG 1 can generate straight line revolutions per minute (RPM) timing pulses between 0 and 5000 counts in 0.5 RPM increments. The speed of the impeller 168 is defined using a binary value corresponding to a desired number of revolutions per minute. The impeller rotation rate is preferably a constant rate established by the first TCG with the preset value for pulse generation for the TCG 1 being determined by the type of mastic in use. Thus, impeller speed can be monitored using TCG 1 output as a reference signal.

The CPU or enable/disable bus 425 is enabled, as shown in block 472, to transport binary output signals from the three TCGs to the microprocessor. An enable master clock, e.g., the clock 418, is used to monitor the periods of time during which the pumping apparatus is undergoing corrective measures (block 474).

With reference to blocks 476, 478 and 480, the microprocessor is programmed to activate relays 2, 3 and 4 to initialize the piston coil 114, the microstep motor 318 and the impeller electromagnets 164, respectively. As stated previously, the position and rate of motion for the piston 98, the motor 318 and the impeller 168 is defined for the particular type of mastic in use using binary values stored in the memory device.

The microprocessor instructs the second and third time clock generators to begin generating pulses (blocks 482 and 484). With reference to blocks 485 and 486, the manner in which time clock generator output signals are used to control the pump will now be described. During operation of the pump, three nearly simultaneous sub-routines occur corresponding to each of the three time clock generators. The first sub-routine begins when the container is loaded and the binary enable switch, e.g., the magnetic read switch, is closed. This begins the generation of pulses by the TCG 1 which are loaded as binary numbers to the CPU bus 425. When the microprocessor instructs the impeller to begin rotating, e.g., controls the application of current to the electromagnet windings 164, a second enable signal is generated. The upper magnetic disk 202 is constructed to have a raised area 203 on its outer edge which corresponds to a lever 443 operating a switch 445 connected to TCG 2. This switch turns TCG 2 on for certain specified time periods from which output signals are derived corresponding to the amount of time it takes the raised area 203 of the upper magnetic disk to complete one revolution and pass the switch. If the pre-programmed schedule of output signals for the TCG 2 is not maintained, that is, the speed of TCG 2 measured in revolutions per minute (RPM) is different from the RPMs established by TCG 1, then the impeller may have encountered drag that is greater than the pre-determined drag coefficient loaded by the software into the memory device 432. Alternatively, the pressure in the pump chamber may be too low. In either case, the microprocessor responds by instructing the load interrupt generator to generate an interrupt signal on the CPU bus. The microprocessor responds to the interrupt signal by jumping to an appropriate subroutine for adjusting the angle of the correction plates 166 with respect to the impeller 168.

In a similar manner, a mastic flow rate detected at the dispensing head using TCG 3 is monitored and compared with a pre-programmed flow rate stored in the memory device 432. The flow of mastic through the dispensing head is monitored using a pressure-type analog instrument such as the spring loaded pressure switches 390. The degree to which the mastic moves each of these analog pressure switches 390 is translated into binary codes corresponding to the rate at which pulses are generated by the TCG 3 and transmitted on the CPU bus 425. If the mastic flow rate detected by either switch differs from the rate stored in the memory device 432, the microprocessor instructs the load interrupt generator to generate an interrupt signal in the CPU bus. The microprocessor in turn jumps to an appropriate subroutine to increase or decrease the impeller rotational speed via amount of current provided to the electromagnets 164.

When insufficient or excessive drag or flow rate is detected, the microprocessor is programmed to use the clock 418 to create a maximum correction period counter. The counter is initialized with a value representing a period of time during which corrections can be attempted. The length of the period depends on the type of mastic or compound being pumped. The counter is decremented (block 488). If data from TCG 2 indicates that the impeller is experiencing an incorrect amount of drag, the microprocessor controls the application of current to the microstep motor 318 in order to vary the positions of the correction plates 166 by spinning the ring gear 292 and the outside spur gears 268 (blocks 490 and 492). The microprocessor therefore has a wide range of timing abilities to compensate for the overall pumping requirements of various heavy liquids. If the pressure switch 390 at the dispensing head and the output data of TCG 3 indicate that the flow of liquid is too slow or too fast as compared with a predetermined stored value, the microprocessor controls the amount of current supplied to the windings of electromagnets 164 in order to increase or decrease the speed of the impeller to correspond with a predefined timing spectrum using TCG 1 and TCG 2 output signals (blocks 494 and 496).

With reference to blocks 498 and 500, if these corrective measures do not cause the output signals from the second and third TCGs to correspond to pre-programmed values within the maximum correction period, the system is malfunctioning. For example, a solid coagulant within the mastic may have become lodged in the pump cavity, causing a significant decrease in mastic flow. The pump may need to be reversed, or powered down and at least partially dismantled, to dislodge the coagulant.

If the system is not malfunctioning, the connection period counter is reset (block 502). When the system malfunctions, the microprocessor disables receipt of interrupt signals on the CPU bus 425, as indicated in block 504. The microprocessor resets the TCG 1 (block 506) and begins to address the microstep motor 318, as indicated in block 508. If a solid was lodged in the impeller, the TCG 2 may have earlier acted to push the correction plates 166 closer to the impeller 168. The microprocessor controls the motor 318 to stop the process of increasing the angle of the correction plates because application of greater pressure will not fix the problem.

With reference to block 510, the microprocessor sets the value of TCG 3 to a new correction duration value when a malfunction has occurred. As described in accordance with blocks 498 and 500, the microstep motor 318 is operated to adjust the correction plates until the maximum correction duration period has ended. The motor is turned off at that point due to a malfunction, as indicated in block 520. The program control loop described in connection with blocks 512, 514, 516, 518 and 520 is designed to temporarily defeat the normal operation of TCG 3 at the head because application head pressure can drop a cavity, for example, in the mastic, even though pressure through the pump chamber is normal. Thus, operation of impeller speed correction is overridden, i.e., the microstep motor is turned on (block 512) for corrective measures to be made (block 514), but the TCG 3 value is preset for a period of time defined by a TCG 3 correction duration counter (blocks 516 and 518). Accordingly, the TCG 3 is prevented from sending interrupt signals indicating that the impeller speed should be increased when adjustment is not required. The microstep motor is then turned off (block 520).

With reference to blocks 522, 524, 526, 528 and 530, a programmed control loop is defined wherein the microprocessor continuously samples all of the sensors, i.e., the output signals of the three TCGs (block 528). This sampling continues during a time period defined by the TCG 3 correction duration counter (blocks 522 and 524), which is decremented (block 526). So long as this counter is non-zero, the microprocessor again enters the loop characterized by blocks 524–528 to ensure that malfunctions are detected in the event that the pressure sensor 390, one of the TCGs or the switch 445 malfunctions, and the microprocessor does not discover it and make corrections. When the maximum correction period counter reaches zero, the values of the TCG units are reset to the initial values discussed above in connection with block 468. The microprocessor timer interrupt is once again enabled (block 472) in order to receive interrupt signals from the TCGs and determine when corrective measures are necessary (block 486).

While advantageous embodiments have been selected to illustrate the invention, it will be readily understood by those skilled in the art that various modifications and alterations can be made without departing from the spirit and scope of the invention as defined in the following claims.

What is claimed is:

1. A dispensing apparatus for providing a continuous supply of fluid material, said apparatus comprising:

a supply container, for containing a fluid material;

a pump having a fluid material inlet and outlet, and a pump impeller, said inlet being connected to said supply container for receiving the fluid material;

a dispensing device connected to said pump outlet, said dispensing device having an outlet for dispensing said fluid material;

a pressure sensor disposed in said dispensing device, for continuously sensing fluid material pressure in said dispensing device; and a processing device connected to said pressure sensor and to said pump, for continuously monitoring fluid pressure at said dispensing device and for adjusting the application of current to electromagnetic coils that operate at least in part to rotate said impeller thereby adjusting the fluid output of said pump in relation to said fluid pressure at said dispensing device.

2. The apparatus of claim 1, wherein said pump comprises a motor for driving said pump at a substantially continuous speed; and pressure adjusting means for selectively adjusting head pressure in said pump, said pressure adjusting means being controlled by said microprocessor control.

3. The apparatus of claim 1, further comprising a feed conduit for coupling to said supply container and feeding fluid material from said supply container to said pump.

4. The apparatus of claim 3, said feed conduit comprising a substantially conical inlet portion having sides diverging at an upper end for coupling with said supply container and converging at a lower end, wherein said conical portion receiving the fluid material substantially eliminates vortices and produces a linear flow of said fluid material.

5. The apparatus of claim 3, said feed conduit further comprising a substantially cylindrical conduit portion coupled to said lower end of said conical portion.

6. The apparatus of claim 1, said dispensing device comprising an applicator for applying the material to a work surface, said pressure sensor in said dispensing device being positioned to detect a pressure change at said applicator whereby said processing device adjusts fluid output of said pump in response to the detected pressure change.

7. A dispensing apparatus for providing a continuous supply of fluid material, said apparatus comprising:

a supply container, for containing a fluid material;

a pump having a fluid material inlet and outlet, said inlet being connected to said supply container for receiving the fluid material;

a dispensing device connected to said pump outlet, said dispensing device having an outlet for dispensing said fluid material;

a pressure sensor disposed in said dispensing device, for continuously sensing fluid material pressure in said dispensing device;

a processing device connected to said pressure sensor and to said pump, for continuously monitoring fluid pressure at said dispensing device and adjusting the fluid output of said pump in relation to said fluid pressure at said dispensing device, wherein said supply container is separable from said pump, said supply container further comprising an outlet to connect said supply container with said fluid material inlet of said pump;

an identification device on said supply container for identifying the composition of the fluid material; and a sensor coupled to said processing device, for contacting said identification device and sending signals to said processing device corresponding to the composition of said fluid material.

8. The apparatus of claim 7, wherein said processing device further comprises control means, for controlling fluid output pressure from said pump in response to the sensed composition of the fluid material.

9. A dispensing apparatus for providing a continuous supply of fluid material comprising:

a supply container, for containing a fluid material;

a pump having a fluid material inlet and outlet, said inlet being connected to said supply container for receiving the fluid material;

a dispensing device connected to said pump outlet, said dispensing device having an outlet for dispensing said fluid material;

a pressure sensor disposed in said dispensing device, for continuously sensing fluid material pressure in said dispensing device;

a processing device connected to said pressure sensor and to said pump, for continuously monitoring fluid pressure at said dispensing device and adjusting the fluid output of said pump in relation to said fluid pressure at said dispensing device;

a feed conduit for coupling to said supply container and feeding fluid material from said supply container to said pump;

a vacuum device coupled to said feed conduit for withdrawing vapors and producing a negative pressure in said feed conduit to draw fluid material from said supply container into said feed conduit.

10. The apparatus of claim 9, said vacuum device comprising a first one way check valve to allow vapors to pass from said feed conduit into said vacuum device;

vacuum means for producing a negative pressure in said vacuum device and drawing vapors from said feed conduit to said vacuum device; and a second one way check valve for discharging said vapors from said vacuum device.

11. The apparatus of claim 10, said vacuum means comprising a hollow cylinder;

a piston reciprocatingly disposed in said cylinder, a piston rod extending from one face of said piston, and having a magnetized portion, an electromagnetic coil having a central opening for slidingly receiving said piston rod, and a power source for energizing said electromagnetic coil to impart linear movement to said piston in a first direction thereby creating a negative pressure in said vacuum device.

12. The apparatus of claim 11, wherein said power source is coupled to said electromagnetic coil via a relay, said relay being controllably operated by said processing device.

13. A dispensing apparatus for providing a continuous supply of fluid material comprising:

a supply container, for containing a fluid material a pump having a fluid material inlet and outlet, said inlet being connected to said supply container for receiving the fluid material;

said pump further including a casing having a fluid inlet and a fluid outlet;

a rotatable impeller disposed in said casing, for conveying fluid material through said casing;

a plurality of pressure plates encircling said impeller and defining an adjustable pressure space between said pressure plates and said impeller;

a dispensing device connected to said pump outlet, said dispensing device having an outlet for dispensing said fluid material;

a pressure sensor disposed in said dispensing device, for continuously sensing fluid material pressure in said dispensing device; and a processing device connected to said pressure sensor and to said pump, for continuously monitoring fluid pressure at said dispensing device and adjusting the fluid output of said pump in relation to said fluid pressure at said dispensing device.

14. The apparatus of claim 13, said pump further comprising adjusting means coupled to said pressure plates and said processing device, for adjusting the position of said pressure plates and adjusting head pressure of said pump.

15. The apparatus of claim 14, said adjusting means further comprising a pivot shaft extending axially from upper and lower ends of each of said pressure plates, said pivot shaft being pivotally mounted with said casing for pivotal movement of each of said pressure plates about a longitudinal axis of said pressure plates;

at least one gear coupled to said pivot shaft of each of said pressure plates;

a ring gear operatively coupled to each of said gears, for imparting simultaneous limited pivotal movement to said pressure plates about said longitudinal axis.

16. The apparatus of claim 15, further comprising drive means operatively coupled to said ring gear and to said processing device, for rotating said ring gear to adjust the position of said pressure plates.

17. The apparatus of claim 16, said drive means comprising a drive gear operatively coupled to said ring gear; and a drive motor coupled to said drive gear for operating said drive gear, said drive motor being coupled to and operated by said processing device.

18. The apparatus of claim 13, wherein said impeller comprises a helical gear having a substantially cylindrical body, an upper and lower axial face, and a plurality of helical teeth for conveying fluid material.

19. The apparatus of claim 18, further comprising at least one magnetic disk coupled to at least one of said axial faces of said impeller, said magnetic disk having a plurality of magnetized areas of alternating polarity disposed radially around said disk;

a plurality of electromagnets disposed around said magnetic disk in a fixed position, a power source coupled to each of said electromagnets and to said processing device, said processing device including means for energizing said electromagnets to have alternating polarities and sequentially reversing the polarities of said electromagnets to cause rotation of said magnetic disk.

20. The apparatus of claim 13, wherein each of said pressure plates are mounted for limited pivotal movement about a longitudinal axis parallel to an axis of rotation of said impeller.

21. The apparatus of claim 20, each of said pressure plates further comprising an inner face having first and second curvilinear concave surfaces opposing said impeller, each said concave surface extending substantially the length of said inner face forming a longitudinal ridge on said inner face.

22. The apparatus of claims 21, wherein said first concave surface has a first curvature of a first radius;

said second concave surface has a second curvature of a second radius, said second radius being longer than said first radius whereby said second concave surface has less curvature than said first curvature.

23. The apparatus of claim 21, wherein said first concave surface has a first arcuate surface defined by an angle of about 18°; and said second concave surface has a second arcuate surface defined by an angle of about 36°.

24. The apparatus of claim 20, each of said pressure plates comprising an inner face having a first and second concave surface defining a frustoconical arc opposing said impeller, each of said surfaces being contiguous along a line extending substantially diagonally across said inner face.

25. The apparatus of claim 24, said first concave surface comprising an arcuate surface defined by an angle of 18°; and said second concave surface comprising an arcuate surface defined by an angle of about 36°.

26. The apparatus of claim 13, wherein said impeller has a substantially cylindrical outer face, and further comprises a plurality of helical gear teeth extending from said outer face, a first recessed area centrally disposed on an upper axial face of said impeller, a plurality of first passageways extending radially outward from a lowermost portion of said first recessed area to said outer face, a second recessed area centrally disposed on a lower axial face of said impeller, and a plurality of second passageways extending radially inward from said outer face to an uppermost portion of said second recessed area.

27. The apparatus of claim 26, further comprising a first conical member disposed in said first recessed area and extending axially from said impeller; and a second conical member in said second recess and extending axially from said impeller.

28. The apparatus of claim 27, wherein said first recessed area is positioned to receive fluid material from an inlet of said pump apparatus, and said second recessed area is positioned to discharge fluid material to an outlet of said pump apparatus.

29. A method for dispensing fluid from a supply container to a dispensing device using a pump, comprising the steps of:

supplying fluid material from a supply container to a pump;

pumping the material into a dispensing device;

measuring the flow rate of said material through said dispensing device;

comparing said measured flow rate with a preprogrammed flow rate stored in a memory device; and adjusting the volume of a pressure space in the pump for adjusting the rate at which said fluid material travels through said dispensing device until said measured flow rate at least approximately coincides with said preprogrammed flow rate.

30. A method as claimed in claim 29, wherein said adjusting step comprises the step of adjusting the application of current to electromagnetic coils that operate at least in part to rotate said impeller to achieve said desired flow rate.

31. A method as claimed in claim 30, wherein said preprogrammed flow rate corresponds the type of said fluid material being pumped and further comprising the steps of sensing an identification code provided on said container which indicates the type of fluid material contained therein and retrieving preprogrammed values from said memory device before said supplying step, said preprogrammed values corresponding to said identification code and comprising said predetermined flow rate.

32. A method for dispensing fluid from a supply container to a dispensing device using a pump, comprising the steps of:

supplying fluid material from a supply container to a pump;

pumping the material into a dispensing device;

measuring the flow rate of said material through said pump;

comparing said measured flow rate with a preprogrammed flow rate stored in a memory device; and adjusting the application of current to electromagnetic coils that operate at least in part to operate said pump thereby adjusting the rate at which said fluid material travels through said pump until said measured flow rate at least approximately coincides with said preprogrammed flow rate.

33. A method as claimed in claim 29, wherein said adjusting step comprises the step of adjusting the position of pressure plates at least partially encircling said impeller to selectively vary the rate at which said fluid material flows over said impeller to achieve said desired flow rate.

34. A method as claimed in claim 30, wherein said preprogrammed flow rate corresponds the type of said fluid material being pumped and further comprising the steps of sensing an identification code provided on said container which indicates the type of fluid material contained therein and retrieving preprogrammed values from said memory device before said supplying step, said preprogrammed values corresponding to said identification code and comprising said predetermined flow rate.

35. A method for dispensing a fluid material from a supply container to a dispensing device using a pump comprising a rotating impeller, comprising the steps of:

generating a first series of timing pulses corresponding to a desired rate at which said impeller needs to rotate to achieve a desired flow rate for said fluid material;

generating a second series of timing pulses corresponding to the rate at which said fluid material flows through said dispensing device;

determining the difference between the rate at which said fluid material flows through said dispensing device and a predetermined flow rate for said fluid material in said dispensing device using said first series and said second series of timing pulses; and varying the application of current to electromagnetic coils that operate at least in part to rotate said impeller to achieve said predetermined flow rate.

36. A method for dispensing a fluid material from a supply container to a dispensing device using a pump comprising a rotating impeller, comprising the steps of generating a first series of timing pulses corresponding to a desired rate at which said impeller needs to rotate to achieve a desired flow rate for said fluid material;

generating a second series of timing pulses corresponding to the rate at which said impeller rotates when said impeller is in contact with said fluid material;

determining the difference between the rate at which said impeller rotates when in contact with said fluid material and said desired flow rate using said first and second series of timing pulses; and adjusting the position of corrective plates at least partially encircling said impeller to selectively vary the rate at which said fluid material flows over said impeller rotates when in said fluid material to achieve said desired flow rate.

* * * * *